United States Patent
Ushiyama et al.

(10) Patent No.: US 7,529,165 B2
(45) Date of Patent: May 5, 2009

(54) TEST WRITING METHOD AND INFORMATION RECORDING DEVICE

(75) Inventors: Junko Ushiyama, Kokubunji (JP); Hiroyuki Minemura, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 716 days.

(21) Appl. No.: 11/196,331

(22) Filed: Aug. 4, 2005

(65) Prior Publication Data
US 2006/0176793 A1 Aug. 10, 2006

(30) Foreign Application Priority Data
Feb. 10, 2005 (JP) ............... 2005-033771

(51) Int. Cl.
*G11B 7/00* (2006.01)
(52) U.S. Cl. .................. 369/47.53
(58) Field of Classification Search ........... 369/116, 369/47.5, 47.51, 47.52, 47.53
See application file for complete search history.

(56) References Cited

U.S. PATENT DOCUMENTS 5,732,062 A 3/1998 Yokoi et al.
6,256,277 B1 7/2001 Saga et al.
7,245,570 B2 * 7/2007 Kurokawa et al. ......... 369/47.5
2001/0053115 A1 12/2001 Nobukuni et al.

FOREIGN PATENT DOCUMENTS

JP 2003-030833 7/2001

OTHER PUBLICATIONS

H. Shingai et al., "The Phase-Change Optical Disc with the Data Recording Rate of 216Mbps", SPIE vol. 5069 (2003), pp. 130-136.
M. Horie et al., "High Speed Rewritable DVD up to 20m/s with Nucleation-Free Eutectic Phase-Change Material of Ge($Sb_{70}Te_{30}$)+Sb", SPIE vol. 4090 (2000), pp. 135-143.

* cited by examiner

*Primary Examiner*—Nabil Z Hindi
(74) *Attorney, Agent, or Firm*—Reed Smith LLP; Juan Carlos A. Marquez, Esq.

(57) ABSTRACT

The object of the present invention is to provide a test writing method for seeking the optimum write power correctly and in a short time under a high speed recording condition in a test writing method and an information recording device for recording information by forming different marks from the unrecorded part by injecting energy onto the recording medium. To achieve the above object, even number length marks and odd number length marks are separately test written in the 2T strategy to seek the respective optimum write power. Due to the possibility of enhancing the precision of test writing, a good recording ability can be obtained.

6 Claims, 29 Drawing Sheets

TEST WRITING METHOD AND INFORMATION RECORDING DEVICE

CLAIM OF PRIORITY

The present application claims priority from Japanese application JP 2005-033771 filed on Feb. 10, 2005, the content of which is hereby incorporated by reference into this application.

CROSS-REFERENCE TO RELATED APPLICATION

This application is related to U.S. application Ser. No. 10/931040 filed on Sep. 1, 2004, the disclosure of which is hereby incorporated by reference.

FIELD OF THE INVENTION

The present invention relates to a test writing method and an information recording device for recording information by forming marks different from unrecorded portion by applying energy into a recording medium.

BACKGROUND OF THE INVENTION

Test writing has been undertaken in order to record information with a high precision on optical disks. Test writing means actions for seeking the optimum recording parameters in response to the environmental temperature at that time and the characteristics of laser beam transmitted by the drives loaded in order to form good recording marks. Optical disks such as DVD-RW, DVD+RV, BD-RE and the like use materials of a composition called "eutectic system" in their recording film. In the recording devices now being produced, normally for test writing on these optical disks, the recording conditions prewritten in the optical disk are read in the first place, and then the laser power is adjusted. The recording condition referred here, for example, the set value of laser power indicated by the write power level (Pw) of a high laser power, the erasing power level (Pe) of a middle power, a set value of laser power represented by the bias power level (Pb), and the respective pulse width of the first pulse constituting multi pulse wave, a plurality of successive middle pulse and last pulse.

In actual test writing, the method of fixing the ratio between the Pw and the Pe prewritten in the optical disk based on these recording conditions and finding out the optimum recording conditions of the laser power as parameters has been adopted. This method is called "the optimum power control method (OPC)." In relatively low speed recording such as BD1×, DVD-RW2-4× and the like, good recording quality has been obtained by test writing by changing only laser power of such a fixed Pw/Pe ratio.

The research and development efforts are now being made in the high-speed recording and reproduction technology in these optical disks. For example, in Optical Data Storage 2003 and Proceedings of SPIE Vol. 5069 (2003), p 130 (Non-patent Document 1), a recording technology with a recording speed of 216 Mbps corresponding to BD 6× is described. As the recording speed accelerates, write strategy adapted to higher speed, or so-called 2T strategy is now being studied. 2T strategy means a write strategy that equalizes the number of recording pulses of a pair of neighboring marks, one of even number length and the other of odd number length. Specifically, as FIG. 2 shows, for example when the shortest mark length is a 2T mark, the 2T mark and the 3T mark emits a single rectangular pulse, and the 4T mark and the 5T mark emits two pulses, the first pulse and the last pulse. The 6T mark and the 7T mark emit three pulses, a first pulse, a middle pulse and a last pulse.

As an example of this 2T strategy, the Japanese Patent Application Laid Open 1997-134525 (corresponding U.S. Pat. No. 5,732,062, Patent Document 1) describes that, for recording either a mark length from even number length mark or odd number length mark corresponding to the recording channel clock frequency in the multi pulse recording system consisting of the first pulse, a plurality of successive middle pulses and the last pulse, the pulse width of the first pulse and the last pulse is made almost identical with the recording channel clock frequency.

And the Japanese Patent Application Laid Open 1999-175976 (corresponding to U.S. Pat. No. 6,256,277, Patent Document 277) proposes the method of forming a recording wavelength in such a way that the shortest pulse width among the multi pulse may be longer than a half of the window width. This will enable to secure a sufficient cooling time of the recording medium, to reduce the frequency component of the laser driving current and therefore to form marks with a sufficient accuracy during a high-speed transmission.

Furthermore, the Japanese Patent Application Laid Open 2003-30833 (Patent Document 3) as well as the Japanese Patent Application 1999-175976 adopt the method of not only making the frequency of the middle pulse string longer than the recording channel clock frequency but also of changing the edge position of the first pulse and the last pulse depending on the preceding space or the succeeding space. It is stated that the present method enables to restrict to the minimum extent possible edge shift due to heat interference in the track direction involved in the case of recording at a high density and high transmission rate and therefore to control recording at a high precision.

And Japanese Patent Application Laid Open 2001-331936 (corresponding to US 2001/053115A1, Patent Document 4) describes the formation of pulse string by shifting the reference clock depending on the even code train or the odd code train and the formation of the write pulse strategy for even number and odd number by changing the duty ratio for the first pulse and the last pulse respectively in the case of odd number and the case of even number.

Incidentally, with regard to the recording mark shape control effect of the 2T strategy during the high-transmission rate recording is described in details, for example, in Optical Data Storage 2000, and Proceedings of SPIE Vol. 4090 (2000), p 135 (Non-Patent Document 2).

[Patent Document 1] Japanese Patent Application Laid Open 1997-134525
[Patent Document 2] Japanese Patent Application Laid Open 1999-175976
[Patent Document 3] Japanese Patent Application Laid Open 2003-30833
[Patent Document 4] Japanese Patent Application Laid Open 2001-331936
[Non-Patent Document 1] Optical Data Storage 2003, Proceedings of SPIE Vol. 5069 (2003), p 130
[Non-Patent Document 2] Optical Data Storage 2000, Proceedings of SPIE Vol. 4090 (2000), p 135

SUMMARY OF THE INVENTION

According to the prior test writing method described above or so-called OPC, laser power based on the fixed ratio of Pw/Pe is optimized, and the recording condition for the best quality has been sought thereby. However, according to the examination of the inventors, it has been newly found very difficult to obtain sufficiently good mark quality according to the OPC method using laser power with fixed ratio of Pw/Pe as parameter when attempts are made to achieve a recording speed in excess of BD 4×, or DVD±RW 8×. This is due to the following reason. In case of a low speed recording such as BD1× or DVD±RW 2.4×, because of a sufficient time between the irradiation of the first pulse and the next pulse (the middle pulse or the last pulse), the recording film is sufficiently cooled at the time of irradiation of the next pulse. In the case of a high-speed, on the other hand, because of a reduction of time between the irradiation of the first pulse and that of the next pulse, the cooling speed of the recording film becomes relatively insufficient, and therefore the problem of insufficient cooling of the front edge portion formed by the first pulse develops. When the next pulse is irradiated while the front edge part is not sufficiently cooled, the front edge part crystallizes leading to the development of an edge fluctuation or an edge shift. This is equal to a deterioration of recording quality due to an acceleration of the recording time.

As the recording speed rises, variation in the characteristics of laser devices mounted on drives available on the market cannot be ignored. For example, the writing channel clock frequency T at BD 4× will be approximately 3.8 ns, making it necessary to control the laser strategy to 1 ns or less. However, since the present rising time and falling time of laser are approximately 1-2 ns, the strategy control of 1 sn is close to the physical limit, and the individual difference in rising and falling of laser will have important impacts on the shape of recording marks. Furthermore, in the case where the waveform of luminescence differs between drives due to the variation of spot diameter between drives and the like, the problem such as that of individual differences between devices absorbed by the medium at low speed looming up at high speed has developed.

Therefore, the present invention takes the following structure.

(1) The write patterns classified according to the excess obtained by dividing mark lengths in the recording code train by an integer constant of n=2 or more corresponding to the mark length of a natural number nx in the window width are respectively recorded and reproduced, and a write power P0 at which modulation gets 0 from the relationship between the modulation and the write power is calculated, and a value obtained by multiplying P0 by a certain constant p is set as the write power of each write pattern.

As this process enables to adjust the write power for each write pattern classified by the excess, write performance improves better than the case wherein the write power of a plurality of write patterns are set across the board in the same way, and the write margin can be expanded.

In other words, in the case of 2T strategy, the process will be as follows. An even number length writing pattern consisting of a length of recording marks corresponding to an even number times of the reference clock frequency and an odd number length writing pattern consisting of recording marks of a length corresponding to an odd number times are recorded and reproduced by changing their respective write power, and based on the results of reproduction thereof, the optimum write power of the even number length and the optimum write power of the odd number length are set. In other words, in case of forming a write strategy for test writing by using a recording laser beam consisting of L pulses by taking the time length of a recording mark as nT (T is the reference clock frequency and n is a natural number of 2 or more), the write pattern will be (1) an even number length pattern formed by marks of nT=2LT, in other words, recording marks formed by a length corresponding to a even number times of the reference clock frequency, and (2) an odd number length write pattern composed of marks of nT=(2L+1) T, in other words recording marks of a length corresponding to an odd number times, and (1) the even number length write pattern and (2) the odd number length write pattern will be respectively recorded. And these write patterns are reproduced, and the relationship of modulation calculated from the write power and reproduced signals is calculated respectively for the even number length and the odd number length, and the value obtained by multiplying the power P0 at which modulation gets 0 by a certain constant p serves as the basis of setting the write power for each write pattern.

Then, in the case of 3T strategy, the process will be as follows. In the case of nT=3LT system, (1) a write pattern formed by the nT=3LT mark, (2) a write pattern formed by the nT=(3L−2) T, and (3) a write pattern formed by the nT=(3L−1) T mark are used to record these, and the relationship of modulation is calculated from the write power and the reproduced signals, and the write power is set based on the P0 obtained from each write pattern.

And, in the case of 4T strategy, the process will be as follows. In the case of nT=4LT, (1) a write pattern formed by the nT=4LT, (2) a write pattern formed by the nT=(4L−2) T mark, (3) a write pattern formed by the nT=(4L−1) T mark, and (4) a write pattern formed by the nT=(4L+1) T mark are used, these are recorded respectively, the relationship of modulation is calculated from the write power and the reproduced signals, and the write power is set based on the P0 obtained from each write pattern.

(2) And it is preferable to conduct test writing by using a confirmation pattern and the write power set by each write pattern described above, and to readjust the write power of each write pattern. This process enables to fine adjust the write power and to obtain the optimum recording condition.

(3) The constant p for multiplying the write power P0 so that the modulation may get 0 is preferably within a range between 1.5 and 3.0. If it is smaller than 1.5, it will be difficult to obtain a sufficient amplitude, and when it is larger than 3.0. the mark width is too large and causes the adjacent mark to crystallize or cross erase. It is more preferable to choose a value between 2.0 and 2.8 for p. The choice of a value of 2.0 or higher for p is more preferable because it enables to reduce any growth in jitter due to variations in power at the time of test writing resulting from a write power offset and other recording conditions. And the choice of a value of 2.8 or less for p is more preferable because it enables to prevent irradiation due to over power and to prevent any fall in performance due to multiple rewriting.

(4) Among a plurality of write patterns classified by the excess obtained by dividing a mark length in the recording code train corresponding to the mark length of n natural number in the window width by an integer constant of n=2 or more, the pattern A is chosen, recorded and reproduced by changing the write power, a write power P0 (A) at which modulation is reduced to 0 from the relationship between the modulation and the write power is calculated, a value obtained by multiplying P0 (A) by a certain constant p is set as the write power Pw (A) of each write pattern, and the write powers of other write patterns are set so that they may be almost the same as the modulation mod (A) at Pw (A).

In this way, the write power will be set for each write pattern classified according to the excess, and almost the same modulation can be obtained even if the write pattern may be different. Therefore, the recording ability improves better than the case wherein all the write powers of a plurality of write patterns are set in the same way across the board, and the recording margin can be expanded. Also, because it is no longer necessary to calculate a write power P0 (A) at which modulation gets 0 for each of a plurality of write patterns, the test writing time can be shortened.

For example, an example in the case of 2T strategy will be shown below. An odd number length write pattern consisting of recording marks of a length corresponding to an odd number times of the reference clock frequency is used, recorded and reproduced by changing the write power to calculate the write power P0 (odd) at which modulation gets 0 from the relationship between the modulation and the write power, and the value obtained by multiplying the P0 (odd) by a certain constant p is set as the write power Pw (odd) for the write pattern. A write power for an even number length write pattern that will be almost the same value as the modulation mod (odd) by the Pw (odd) is calculated, and this will be the write power Pw (even) for the even number length write pattern. Here again, the write power of the Pw (odd) and the Pw (even) may be used to undertake test writings by a confirmation pattern and readjust the write power of each write pattern. At this time, it will be effective to fine adjust only the Pw (even) by pegging the Pw (odd). Such test writings by means of a confirmation pattern will enable to fine adjust the write power and to obtain the optimum recording conditions.

In addition, after the optimum write power (odd) has been obtained by an odd number length mark, it is possible to obtain Pw (even) by multiplying Pw (odd) by a certain constant q or by adding a constant r as a means for obtaining the optimum write power (even) for a write pattern consisting of only an even number length of marks.

In the case of 2T strategy, a write pattern consisting of an even number length mark or a write pattern consisting of an odd number length is test written to obtain a write power, and the write power is multiplied by a constant q or a constant r is added thereto to obtain the write power of the other write pattern. In other words, the relationship between the write power Pw (odd) for recording the write pattern consisting of an odd number length and the write power Pw (even) for recording the write pattern consisting of an even number length is Pw (odd)=q×Pw (even) or Pw (odd)=Pw (even)+r. In the 2T strategy, a pair of adjacent even number length mark and odd number length mark are recorded by using a write strategy consisting of a same number of pulses. For example, if the shortest mark length is 2T mark, 2T mark and 3T mark generate a single rectangular pulse, and 4T mark and 5T mark generate two pulses consisting of the first pulse and the last pulse. At this time, an even number length mark and an odd number length mark may have a different recording sensibility due to the influence of write strategy form and the thermal property and crystallization property of the medium. When the relationship between the write power Pw (odd) for recording a write pattern consisting of an odd number length and the write power Pw (even) for recording a write pattern consisting of an even number length is correlated by a mathematical formula, it is enough to test write only one of the write patterns, and therefore the time required for test writing can be curtailed. The value of the constant q and the constant r should preferably be set before shipping the drive. Or, when a medium is first loaded, the value of q and r may be determined by learning and the medium ID and the value of q and r may be correlated.

(6) The asymmetry of the shortest mark length among write patterns including the odd number minimum length mark and the asymmetry of the shortest mark length among write patterns including the even number minimum length mark are calculated and the write power Pw (odd) for recording the write patterns consisting of an odd number length and the write power Pw (even) for recording the write patterns consisting of an even number length are respectively set in such a way that both of the former may be nearly identical. For example, in the case where the minimum mark is a 3T mark, the respective power by which the asymmetry of 3T mark Asym (3T) among the write patterns including 3T marks and the asymmetry of 4T mark Asym (4T) among the write patterns including 4T marks are nearly identical is taken as the write power. At this time, only the asymmetry of 3T marks Asym (3T) may be reproduced for the write patterns of an odd number length and the asymmetry of 4T marks Asym (4T) may be reproduced for the even number length marks.

As the setting of write powers by taking into account such asymmetry concerns values obtained by comparing different mark lengths recorded at the same time, even if a power offset due to defocusing, an electric offset or the like occurs during a test writing, the impacts of these offsets can be controlled. On the other hand, signal amplitude, modulation and the like are directly affected by these offsets, they require attention during test writing for setting write power. Here, the term asymmetry has been used for the sake of consistency. Actually, however, it is better to use β. The β is defined by the following formula, and is governed by the technical standard of DVD-RW and the like.

$$\beta = (A1+A2)/(A1-A2)$$

wherein β is a value calculated from AC coupled HF signals, and A1 and A2 represent respectively the peak levels (the high level and the low level) of AC coupled HF signals. In other words, (A1+A2) represents the difference between the peak levels, and (A1−A2) represents the peak-to-peak values of the HF signals.

And the write power may be set by using γ. The γ is defined by the following formula and is governed, like β, by the technical standard of DVD-RW and the like.

$$\gamma = (dm/dPw)*(Pw/m)$$

wherein m represents the modulation of the HF signals.

Such a method is effective not only in optical disks of the type having a recording layer but is particularly effective in optical disks of the type having multiple recording layers. For example, an optical disk having double recording layers is disturbed with the problem of the recording margin for each recording layer getting narrower than that of a disk having a single recording layer. However, as in the present invention, it becomes possible to expand the recording margin by controlling the write power according to the write pattern. This is particularly effective for test writing on rewritable media using a eutectic type recording film such as DVD-RW, DVD+RW, BD-RE and the like.

The conduct of such test writings sometimes requires more time than that of a similar test writing-in the past. However, in the case of a medium requiring the operation of "printing" (writing) data such as DVD+RW, BD-RE and the like, the time required for test writing a few seconds, and because of an overwhelmingly longer time required for "printing" (writing) operation (for example 10 minutes), even if the time required for test writing exceeds five times, the time of keeping the user waiting barely changes, and the convenience of the optical disk does not decrease nor does it constitute a demerit for the user.

In addition, the present invention is particularly effective for high-speed recording and is particularly effective for recording on a recording type medium using a so-called eutectic type and crystal growth type recording film with a condition of a recording speed of 20 m/s or more.

And a modulation of 0 indicates that absolutely no mark has been formed. Therefore, if the write power is so low that the recording film may be unable to reach a melting temperature, the modulation gets 0, and in the present invention the maximum write power effectively making the modulation 0 is important. For obtaining a modulation of 0 on a drive, the modulation in effect at the time of changing the write power may be respectively obtained and the relationship between the write power and the modulation may be calculated based on the specified formula for calculation. In other words, the write power at which modulation gets effectively 0 (the X intercept in the graph is 0) may be obtained by extrapolating from a graph showing the relationship between the write power and the modulation. Depending on the formula of calculation used or the number of measurement data, the write power P0 at which modulation gets 0 may move to some extent. However, in such a case, P0 is still in a sufficient range of error for calculating the optimum power.

According to the present invention, which enables to enhance the precision of test writing, it is possible to provide a high-speed optical disk of a better recording quality.

BRIEF DESCRIPTION OF THE INVENTION

DETAILED DESCRIPTION OF THE PREFERRED EMBODIMENTS

Embodiment 1

We will describe below the embodiments of the present invention with reference to drawings.

To begin with, we will describe the recording method used in the present invention. For writing data on an optical disk, the multi pulse mark edge recording method will be used to write data on the disk to provide the information on the length of marks and spaces. And a modulation method combining mark lengths ranging from 3T to 14T and space lengths ranging from 3T to 14T is used.

Figure 2:
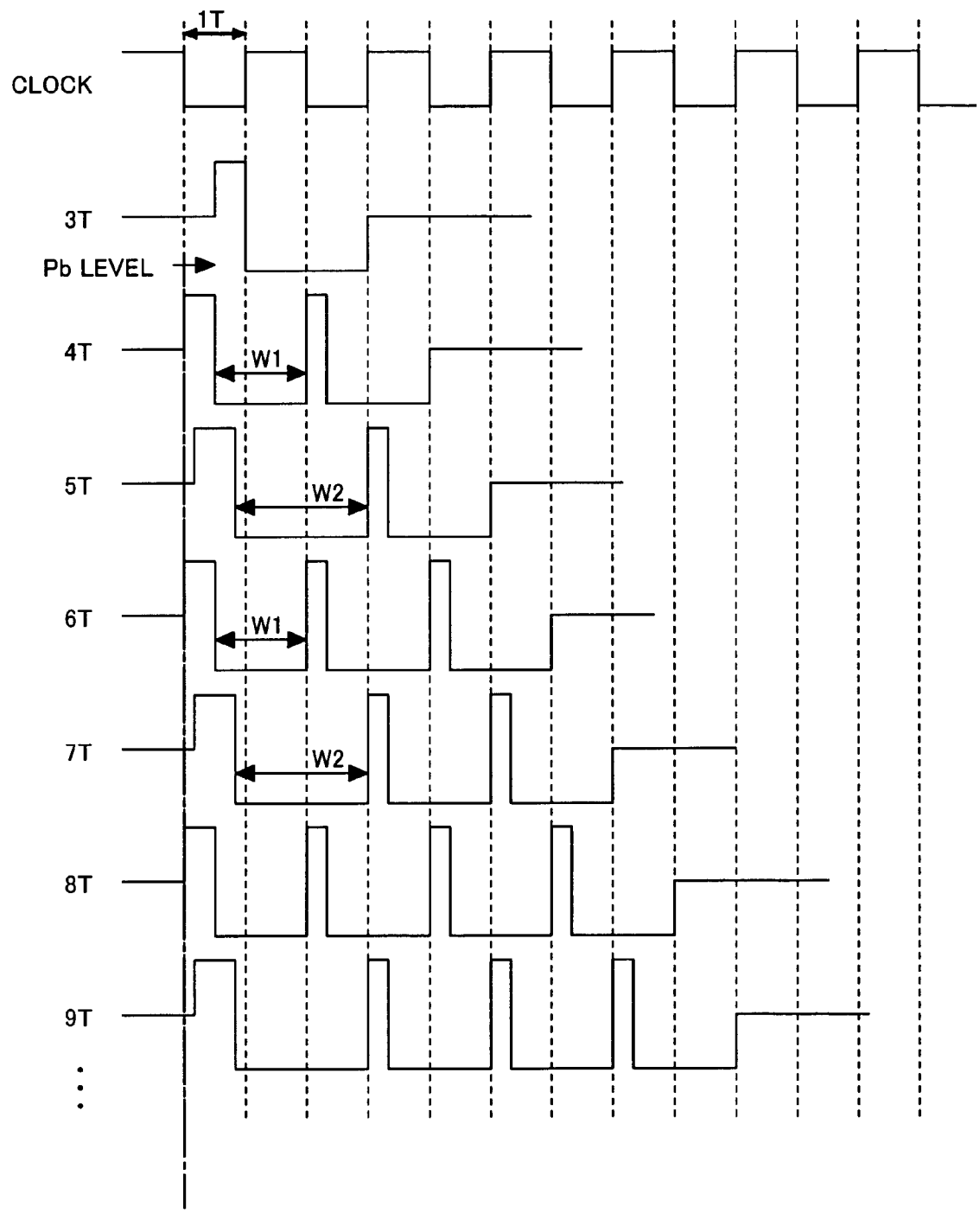
FIG. 2 is an illustration showing an example of recording pulse strategy used in the present invention.

FIG. 2 shows an example of a write strategy used in the present invention. In the present embodiment, a 2T strategy is used. 3T mark is formed by a single pulse, and 4T mark and 5T mark are formed by two pulses, the first pulse and the last pulse. 6T mark and 7T mark are composed of three pulses consisting of the first pulse, the last pulse and a middle pulse. And 8T mark and 9T mark are composed of four recording pulses in total consisting of the first pulse, the last pulse and two middle pulses. Thereafter, as the mark length becomes longer, the number of middle pulses increases. Here, when the recording mark is represented by nT (T represents the reference clock frequency and n represents a natural number of two or more), an even number length mark such as 4T and 6T is represented by nT =2LT, and an odd number length mark such as 3T and 5T can be represented by nT=(2L+1)T, wherein L is a natural number and represents the number of recording pulses.

For the disk, a rewritable DVD (a phase change type disk adapted to red light source) capable of 8× recording is used, and a drive with a semiconductor laser of 660 nm wavelength is used for reproducing and measuring recordings. Linear velocity is set at approximately 27.9 m/s. The clock frequency T in FIG. 2 is approximately 4.8 ns.

Figure 1:
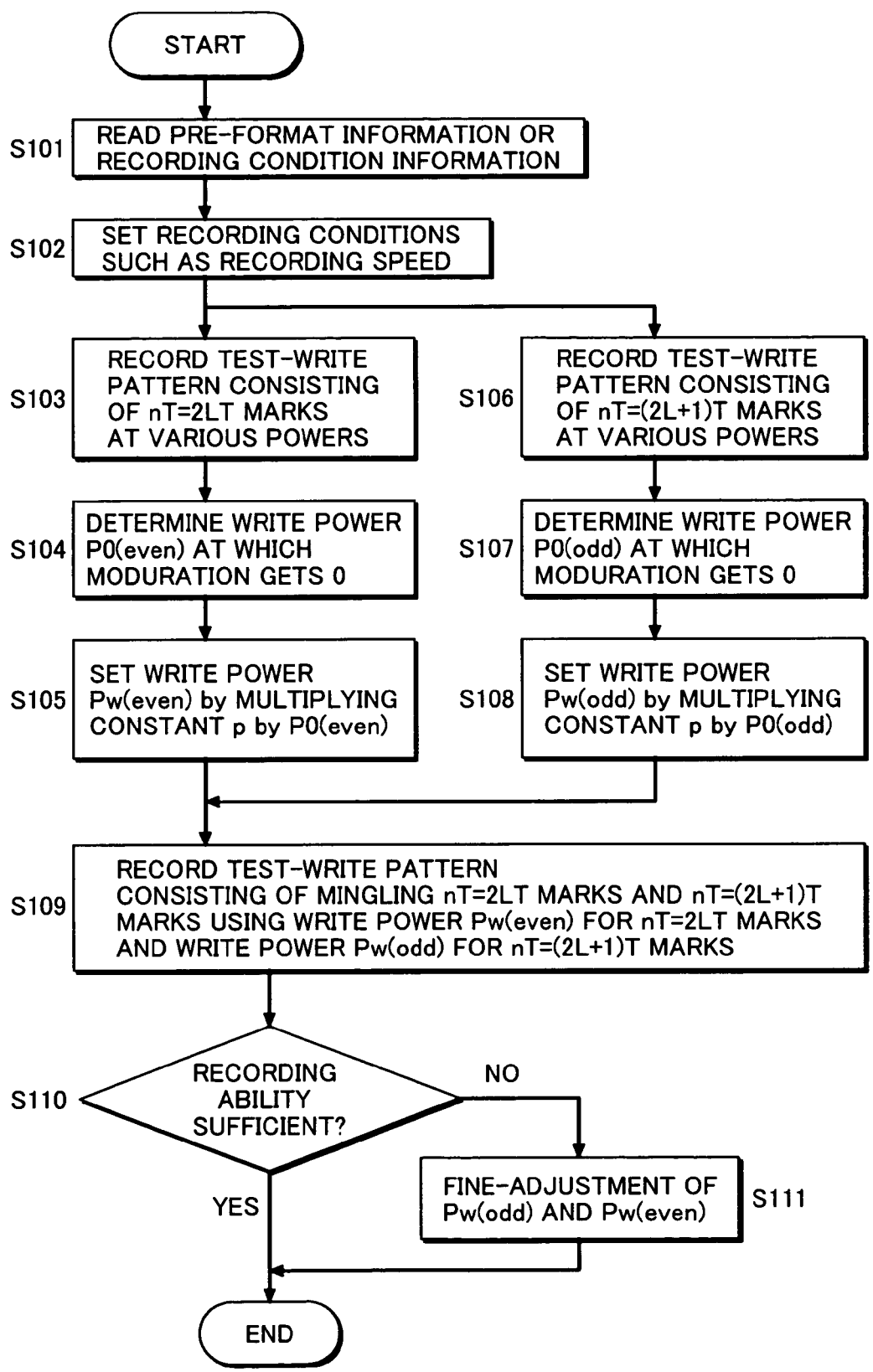
FIG. 1 is a flowchart showing a test writing method according to an embodiment of the present invention.

A flowchart describing the operation of the test writing method according to the present embodiment is shown in FIG. 1, and we will describe the present invention with reference to the same. In the first step (S101), we read the recommended write power, the pulse width and other recording conditions recorded in the disk, and as a result we obtained a write power (Pw) of 38 mW, an erase power (Pe) of 8 mW, and a bias power (Pb) of 0.1 mW in the form of laser power. For the second step (S102), we set the laser power conditions in the vicinity, and for the third step (S103-S108) we conducted test writings on the disk. As for the laser power conditions, fixing the Pb value, and taking the ratio between Pw and Pe (Pw/Pe) as fixed values, we changed the write power from 0.4 times to 1.2 times of the recommended write power, in other words from 15.2 mW to 45.6 mW. As for erase power Pe, together with Pw, we changed them from 3.2 mW to 45.6 mW. At this time, we conducted separate test writings by using two types of test writing write patterns consisting of a write pattern composed of only even number length marks and another composed of only odd number length marks. In the third step (S103) we conducted test writings several times by using a test writing write pattern composed of even number length marks and by changing the write and erase power, and in view of the relationship between the write power and the modulation obtained in the third step, in the fourth step (S104) we obtained 17.5 mW as the write power P0 (even) at which modulation gets 0. In the fifth step, we multiplied P0 (even) by 2.1 as the constant p and obtained a write power for even number length marks Pw (even) of 36.8 mW.

Similarly, we recorded by using a write pattern for test writing composed of odd number length marks, obtained the relationship between the write power and the modulation (S106), and determined the write power P0 (odd) at which modulation gets 0 (S107). Then, we multiplied P0 (odd) by the constant p of 2.1 and obtained 38.9 mW as the write power for odd number length mark Pw (odd).

For the ninth step (S109) we recorded by using a write pattern for test writing in which even number length marks and odd number length marks are mixed by using the write power for odd number length marks and the write power for even number length marks obtained from the third step through the eighth step, and for the tenth step (S110) we confirmed the recording ability and we obtained a sufficient jitter for practical use of 5.1%.

For comparison with the prior method, we obtained a write power P0 at which modulation gets 0 by using a write pattern for test writing in which even number length marks and odd number length marks are mixed, multiplied the P0 by the constant p=2.1 and as a result we obtained a write power Pw=37.8 mW. When we recorded and reproduced by maintaining the write power for both even number length marks and odd number length marks at the same level of 37.8 mW, the jitter was 6.5%. On the other hand, we could obtain a better recording ability by setting separately the write power for even number length marks and for odd number length marks.

In the present embodiment, as a good jitter could be obtained at the ninth step, it was unnecessary to proceed to the eleventh step (S111). However, when a good jitter cannot be obtained in S110, it is better to fine adjust Pw (odd) and Pw (even).

The test-write patterns for even number length/odd number length marks used in the present embodiment are composed of even number length/odd number length marks only in their marks and their space part may be composed of a mixture of even number length and odd number length. In other words, with regard to the space length, it is unnecessary to set any restrictions such as providing even number length of spaces for test-write patterns for even number length marks.

Figure 19:
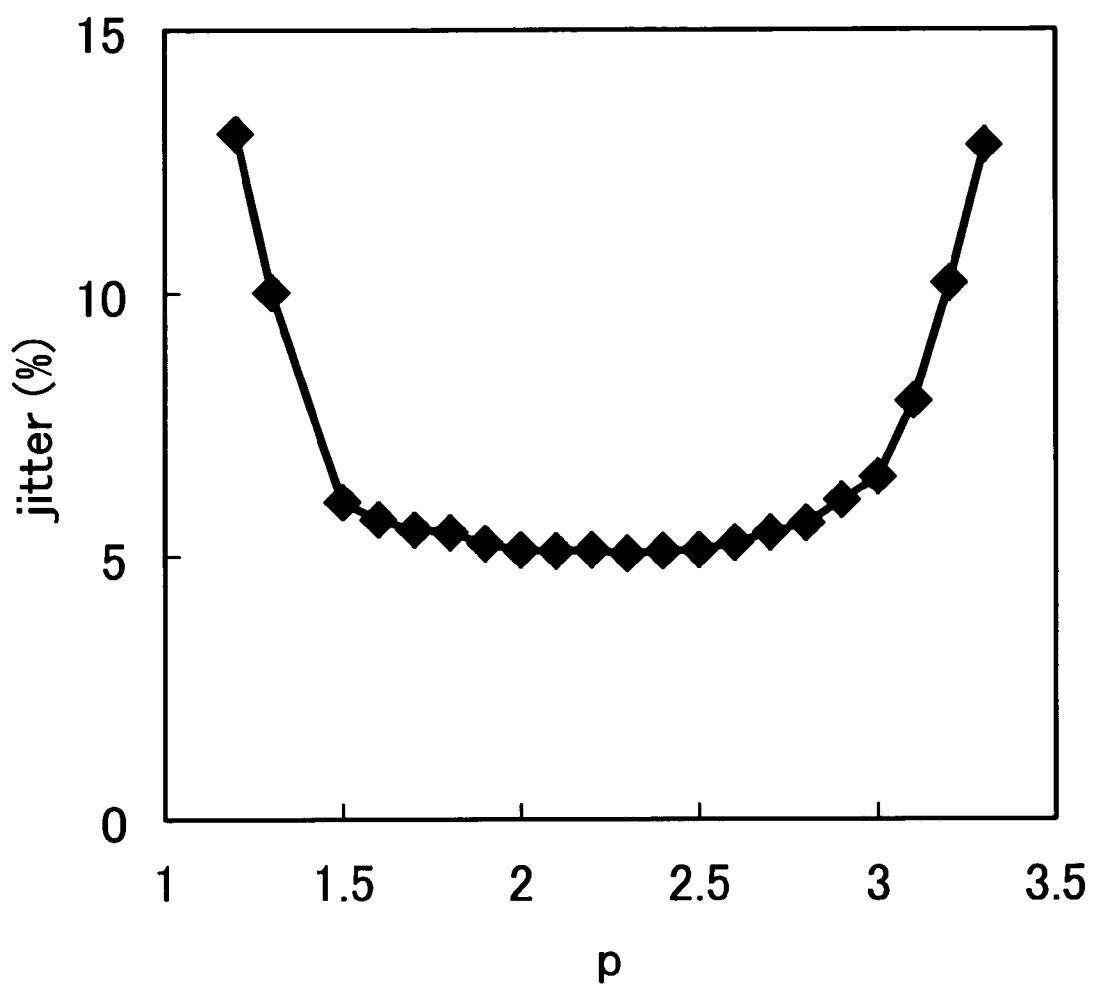
FIG. 19 is a graph showing the relationship between the write power and the constant p according to an embodiment of the present invention.
Figure 20:
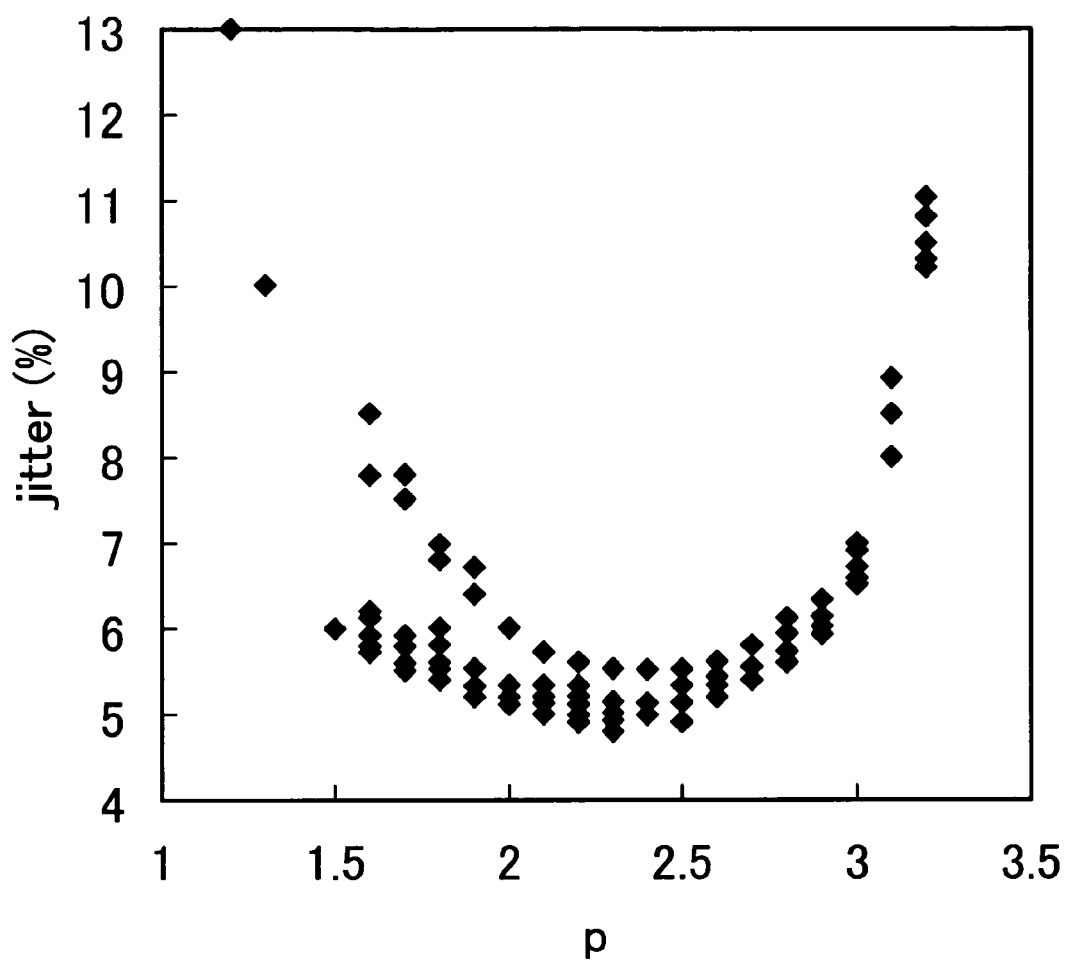
FIG. 20 is a graph showing the relationship between the write power and the constant p according to an embodiment of the present invention.
Figure 21:
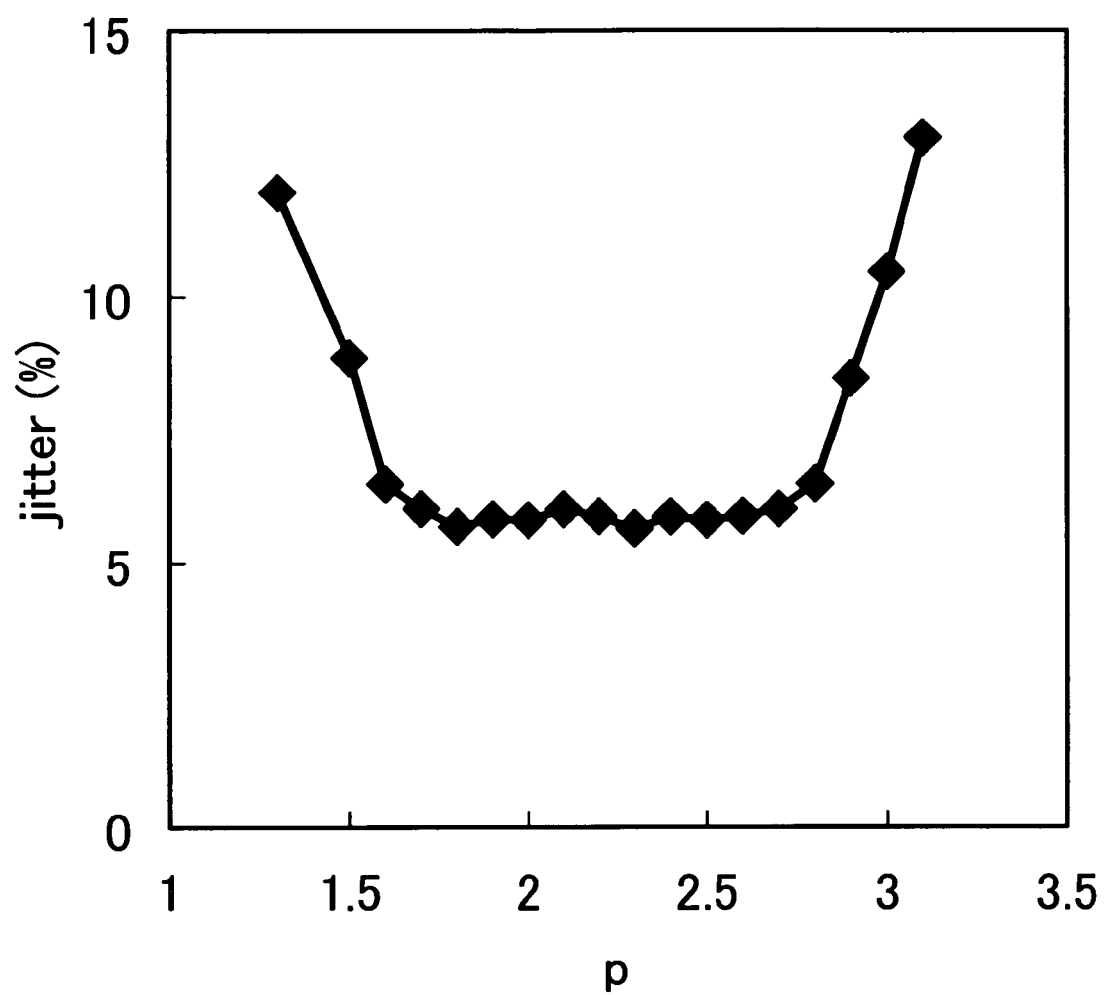
FIG. 21 is a graph showing the relationship between the write power and the constant p according to an embodiment of the present invention.

In the present embodiment, we set the constant p for multiplying the write starting power P0 at 2.1. When we made the constant p smaller than 1.5, as FIG. 19 shows, the reproduction jitter worsened rapidly because it was no longer possible to obtain a sufficient amplitude, and when p=1.2, the reproduction jitter worsened to 13.0%. And with p=3.3, the jitter stood at 12.8%, and thus when the constant p is made larger than 3.0, the jitter worsened considerably. This is due to an expansion of the recording mark width to such an extent as the effect of cross erasure cannot be ignored. Therefore, it is preferable that the constant p be larger than 1.5 and smaller than 3.0. Furthermore, when the constant p is set at 2.0, the jitter obtained after several test writings was within a good range of 5.1-6.0%. When we chose a constant p smaller than 2.0, for example a value of 1.8, the range of jitter obtained after several test writings expanded to 5.4-7.0% and at the same time the maximum jitter grew larger (FIG. 20). When the constant p is smaller than 2, the effect of the jitter having grown larger due to the development of a write power offset and the like because of dust, stains or some other causes will be considerable. Therefore, it is more preferable that the constant p be larger than 2.0. And FIG. 21 shows the relationship between the jitter obtained after 500 multiple recordings and the constant p. When p grows larger than 2.8, the recording film is destroyed due to overpower and the jitter worsens. By keeping p not larger than 2.8, it is possible to prevent irradiation by overpower and to prevent any deterioration of performance due to multiple rewritings, and therefore it is more preferable.

In the 2T strategy, the number of recording pulses of a pair of adjacent even number length marks and odd number length marks are equal. For example, as FIG. 2 shows, each 4T mark and 5T mark are respectively composed of two recording pulses, and each 6T mark and 7T mark are respectively composed of three recording pulses. What is characteristic here is that the pulse width (W1) at the Pb level after the irradiation of the first pulse of the 4T mark and that (W1) of the 6T mark have nearly the same length, and similarly the pulse width (W2) at the Pb level after the irradiation of the first pulse of the 5T mark and that (W2) of the 7T mark have nearly the same length. The position of the front edge of the recording mark formed by the first pulse is affected by the beginning position of the recording pulse following the first pulse. For example, when the recording pulse following the first pulse are far from the first pulse, due to the narrowing of the region that will be re-crystallized after the melting of the recording film, the front edge position shrinks little and is fixed at a position near the front edge of the melting region. On the contrary, when the recording pulses following the first pulse approach the first pulse, due to the expansion of the region that will be re-crystallized after the melting of the recording film, the front edge position shrinks violently and the front edge position will be fixed after the melting region.

It is considered that 4T marks and 6T marks as well as 5T marks and 7T marks are respectively affected in the same way in terms of the impact of irradiation of the recording pulses following the first pulse (middle pulses or the last pulse) on the front edge position. As FIG. 2 shows, 8T mark will have a front edge position similar to that of 4T and 6T. The use of such write patterns for test writing composed solely by marks having similar thermal characteristics makes it difficult to see the growth of jitter due to changes in the edge position resulting from the shape of recording pulses of a plurality of types, it will be possible to obtain accurately and effectively the optimum recording pulse width.

In the present embodiment, as FIG. 2 shows, with regard to the 3T mark formed by a single pulse, we set independently the recording pulse conditions including the first pulse position. The reason is that, as the 3T mark is composed of a single pulse, the process by which the front edge position is determined is different from that of other marks composed of a plurality of recording pulses. In the present embodiment, in the test writing of step S109, the recording pulse conditions of the 3T mark are obtained at the same time as obtaining ΔT in the $10^{th}$ step (S110).

And in the present embodiment, we set an equal number of recording pulses for nT=2LT and nT=(2L+1)T so that 4T mark and 5T mark may be composed of a same number of pulses. On the other hand, when the recording pulses for nT=2LT and nT=(2L−1)T are equal so that 5T and 6T may have a same number of pulses, the present invention is effective in the same manner.

And, in the present embodiment, the power P0 (even) and P0 (odd) at which modulation gets 0 are multiplied by a constant p for calculating the write power for even number length marks and for odd number length marks. However, when the relationship between the modulation and the power is largely different between the time of recording even number length marks and the time of recording odd number length marks, a different value may be used for the multiplication value p. In other words, depending on the characteristics of the medium, the constant p may be set at different values, one for the even number length marks and another for odd number length marks.

Figure 28:
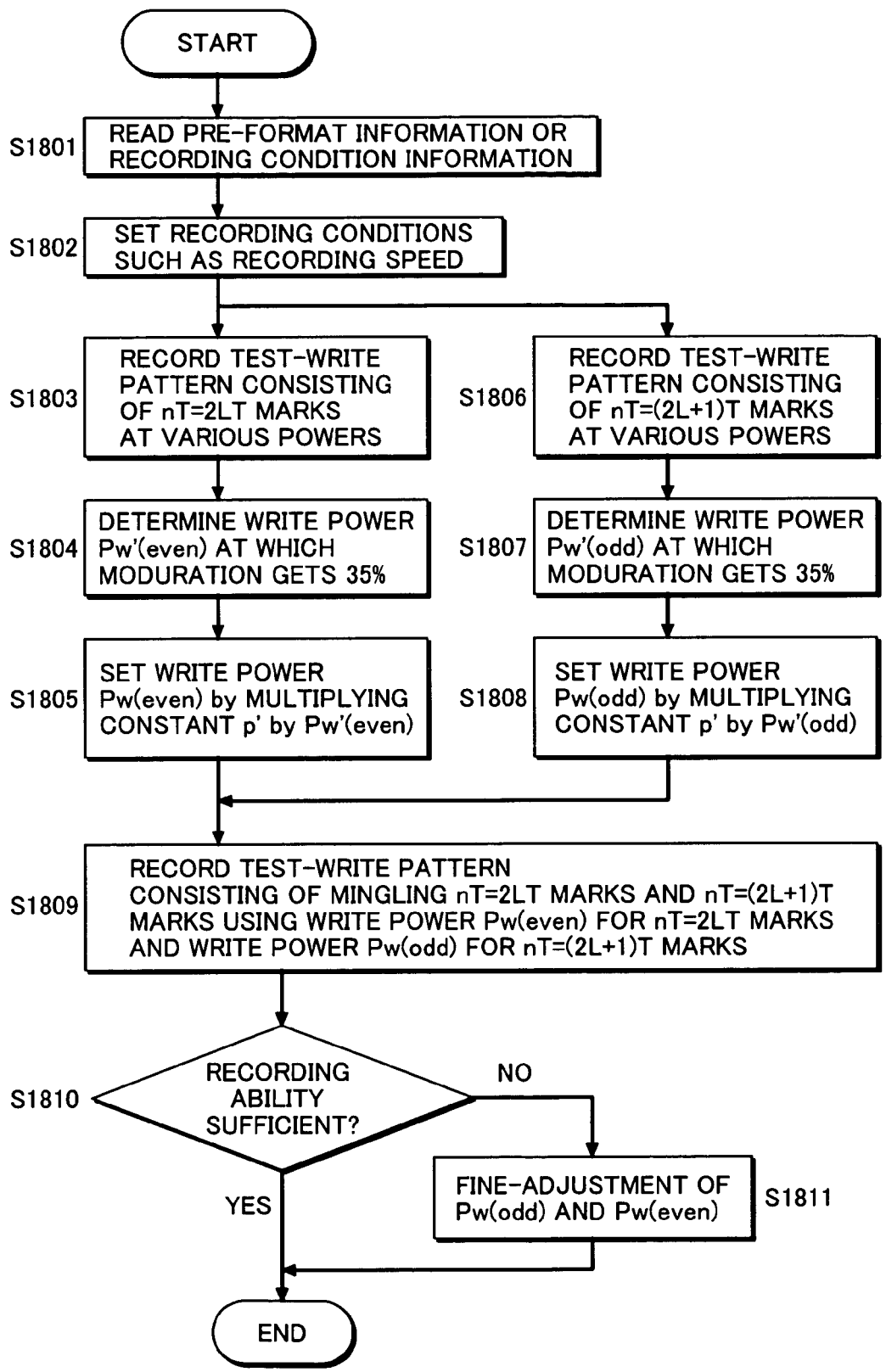
FIG. 28 is a flowchart showing a test writing method according to an embodiment of the present invention.

And in the present embodiment, we set Pw (even) by multiplying the write power P0 for effectively at which modulation gets 0 by a constant p. However, instead of the modulation 0, we may seek a Pw' at which modulation gets a predetermined value between the modulation 0 and the saturated modulation, and may obtain Pw by multiplying the Pw' by a constant p'. An example is shown in FIG. 28. FIG. 28 shows the test writing method when the predetermined modulation is set at 35%. It is preferable that the set modulation be within a range of 25% to 40% wherein the variation of modulation is sharp in relation to the variation of the write power and the writing does not get blurred. A sharp variation of the modulation in relation to the write power means the possibility of setting accurately the write power. The constant p' is a constant set by the disk or drive used, and it may be often $1.2 \leq p' \leq 2.5$. In the case of the drive and medium used in the present embodiment, we calculated by taking Pw' (even) obtained in the step S1804 of FIG. 28 as being equal to 23.0 mW, and Pw' (odd) as being equal to 24.3 mW, and setting p'=1.6 we calculated Pw (even) as being equal to 36.5 mW, and Pw' (odd) as being equal to 38.9 mW. When we confirmed the recording ability in step S1810, the jitter stood at 5.1% and we could obtain a practically passable recording ability. Thus, the write power value calculated respectively from P0 and Pw' do not necessarily coincide. When the recording ability is not found to be sufficient as a result of the confirmation of the recording ability in the step S110 of FIG. 1 or the step S1810 of FIG. 28, it is preferable to fine adjust the same in the step S111 of FIG. 1 or the step S1811 of FIG. 28.

Embodiment 2

Figure 4:
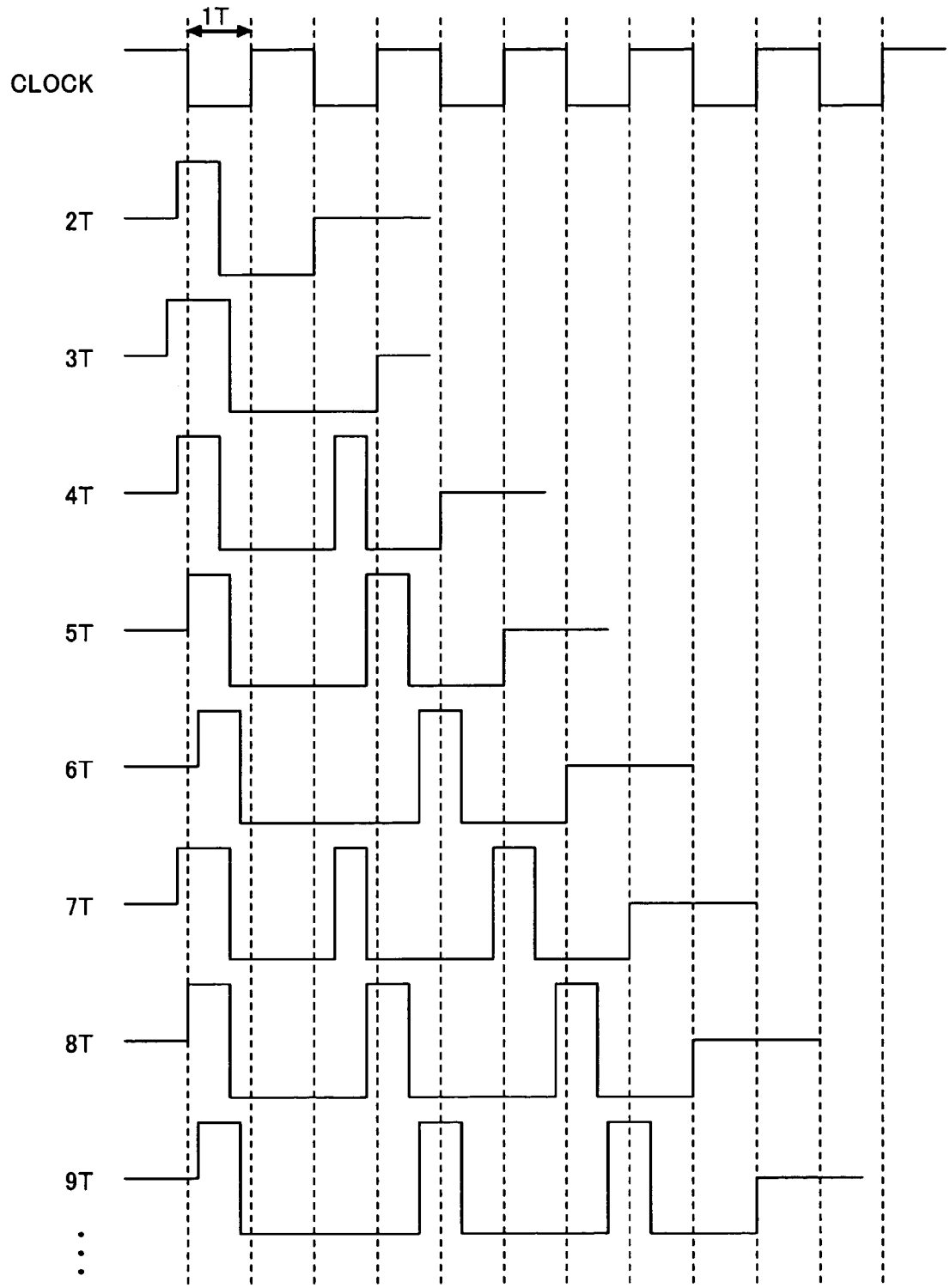
FIG. 4 is an illustration showing an example of recording pulse strategy used in the present invention.

In the embodiment 1, we used the so-called 2T strategy wherein the number of recording pulses in the adjacent even number length marks and odd number length marks is the same. However, in the present embodiment, the case of using 3T strategy is shown. The 3T strategy is a strategy wherein the number of recording pulses of the marks represented by nT=3LT, nT=(3L−2) T and nT=(3L−1) T are the same. In this strategy, L is a natural number and represents a number of recording pulses. For example, 4T-6T marks are respectively composed of two recording pulses, and 7T-9T marks are respectively composed of three recording pulses. Such a 3T strategy is shown in FIG. 4 (in the embodiment 2, however, the write strategy composed of 3T-14T is used).

Figure 5:
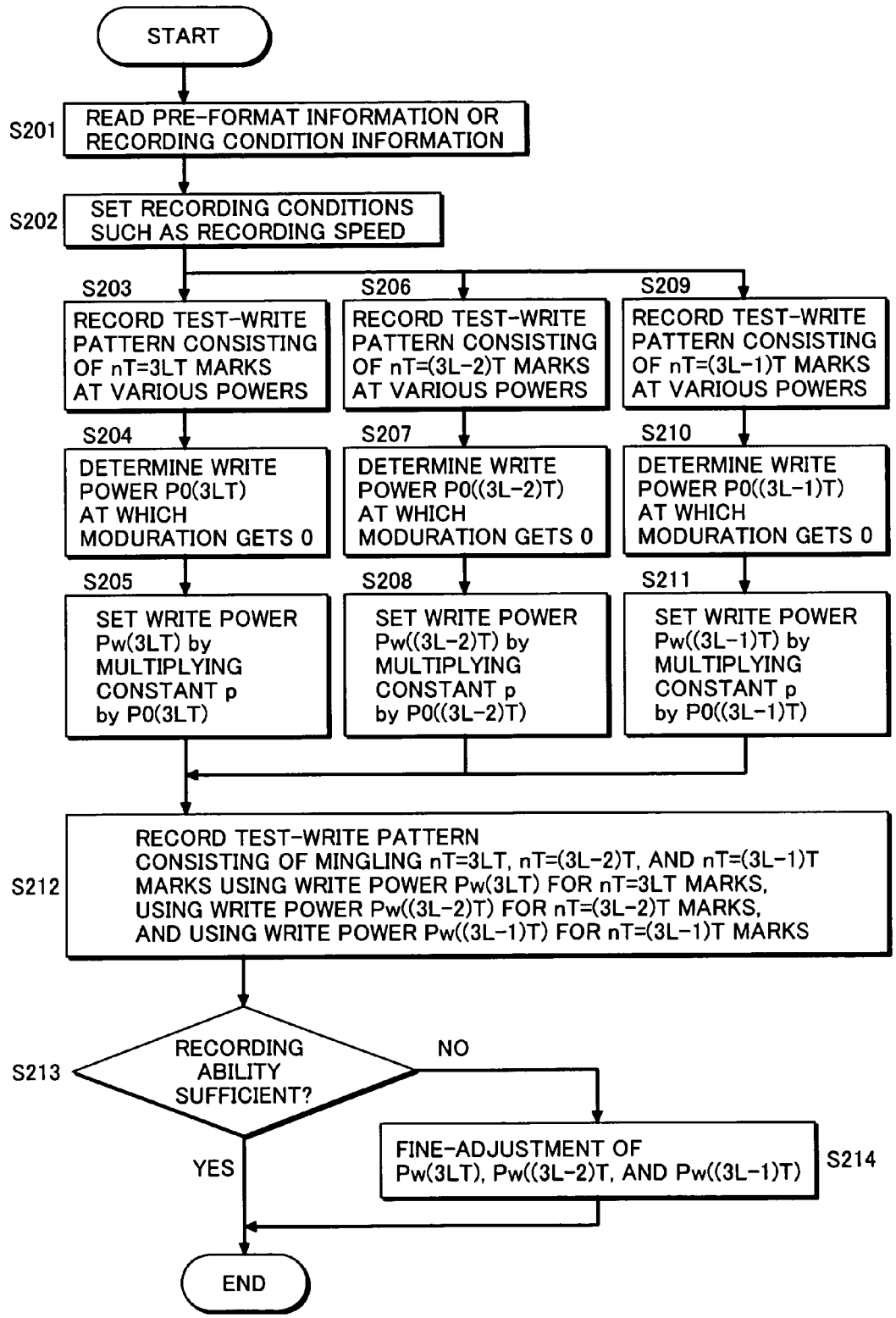
FIG. 5 is a flowchart showing a test writing method according to an embodiment of the present invention.

In the present embodiment, a rewritable DVD capable of 10× recording is used for the optical disk, and a drive provided with a semiconductor laser of a wavelength of 660 nm is used for recording, reproduction and measurement. This drive is capable of setting the maximum of three levels for the write power Pw level. We set its linear velocity at 34.9 m/s. The 3T strategy, like the 2T strategy, includes three types of pattern consisting of a write pattern for test writing composed of nT=3LT marks, a write pattern for test writing composed of nT=(3L−2) T marks and a write pattern for test writing composed of nT=(3L−1) T marks, and we obtained the relationship between the write power and the modulation when each write pattern is used for recording according to the flowchart of FIG. 5.

To begin with, for the step S201, we read the recommended write power, pulse width and other recording conditions recorded in the disk, and obtained a write power (Pw) of 56 mW, an erase power (Pe) of 11 mW, a bias power (Pb) of 0.3 mW in the form of laser power. For the step S202, we set the laser power conditions in the vicinity, and for the steps S203-S211, we conducted test writing on a disk. As for the laser power conditions, we fixed the Pb value, and we varied the write power from 0.4 times to 1.2 times of the recommended write power, in other words from 22.4 mW to 67.2 mW taking the ratio between Pw and Pe (Pw/Pe) as a fixed value. As for the erase power Pe, we varied the same along with Pw from 4.4 mW to 13.2 mW. At this time, we conducted separate test writings by using two types of write patterns for test writing, i.e. a write pattern composed solely of even number length marks and another write pattern composed solely of odd number length marks. In the step S203, we conducted several test writings by using a write pattern for test writing composed of nT=3LT marks and by changing the write and erase powers, and the relationship between the write power and the modulation that we obtained in the step S203 served as the basis of a value of 20.9 mW that we obtained as the write power P0 (3LT) at which modulation gets 0 in the step S204 when we recorded a write pattern for test writing composed of nT=3LT marks. Similarly, in the step S207, we obtained 19.1 mW as the write power P0 ((3L−2)T) at which modulation gets 0 at the time of recording the nT=(3L−2) T marks, and in the step S210, we obtained 20.2 mW as the write power P0 ((3L−1)T) at which modulation gets 0 at the time of recording the nT=((3L−1)T). Then, we multiplied each P0 by 2.8 for the constant p and obtained 58.5 mW for the write power Pw (3LT), 53.5 mW for Pw (3L−2)T), and 56.6 mW for Pw ((3L−1)T) (steps S205, S208, S211).

In the step S212, using the three types of write powers obtained as described above, we recorded a write pattern for test writing wherein mark length and space length from 3T to 14T are arranged at random, and in the step S213 as a result of our confirmation of the recording ability, we could obtain a practically passable jitter of 7.5%. Further, in the step S214, we could contain the jitter to 7.0% by fine-tuning Pw (3LT) from 58.5 mW to 59.1 mW.

In the present embodiment we set the constant p at 2.8. However, as we increased the constant p to larger than 2.8, the allowable maximum frequency of rewriting decreased. For example, when the initial random signal jitter is compared, with p=2.8, its value was 7.5%, and with p=3.0, it was 8.1% and thus both values were practically passable. With p=2.8, however, the reproduction jitter did not change and constituted practically no problem until the frequency of rewriting reached 1,000 times. With p=3.0, however, at the $800^{th}$ rewriting, the jitter value exceeded 13%. Therefore, it is preferable to keep the value of p=2.8 or less.

And in the present embodiment, we used jitter as a factor of assessment of the reproduction characteristic. However, any change in the type of factors of assessment brought about no change in the effect of the present invention. For example, PRML and the like may be used for the evaluation of its reproduction performance.

Actual user data were recorded by using the write power obtained as a result of these test writings.

Embodiment 3

In the embodiment 1, we conducted respective test writing by dividing the write patterns for test writing between the even number length marks represented by nT=2LT and the odd number length marks represented by nT=(2L+1)T, multiplied the respective write power P0 at which modulation gets 0 with a constant p and as a result obtained the optimum write powers for the odd number length marks and the even number length marks. In the present embodiment, we will show a method of seeking the relationship between the modulation and the write power by varying substantially the write power for only one test-write pattern, seeking the write power of the other write pattern in such a way that the latter write power may be nearly the same as the modulation at the write power sought, and thus setting the write power.

In the present invention, we used a write strategy similar to the embodiment 1, a rewritable-type DVD disk capable of 8× recording and a drive provided with a semiconductor laser with a wavelength of 660 nm. We set its linear velocity at approximately 27.9 m/s.

Figure 6:
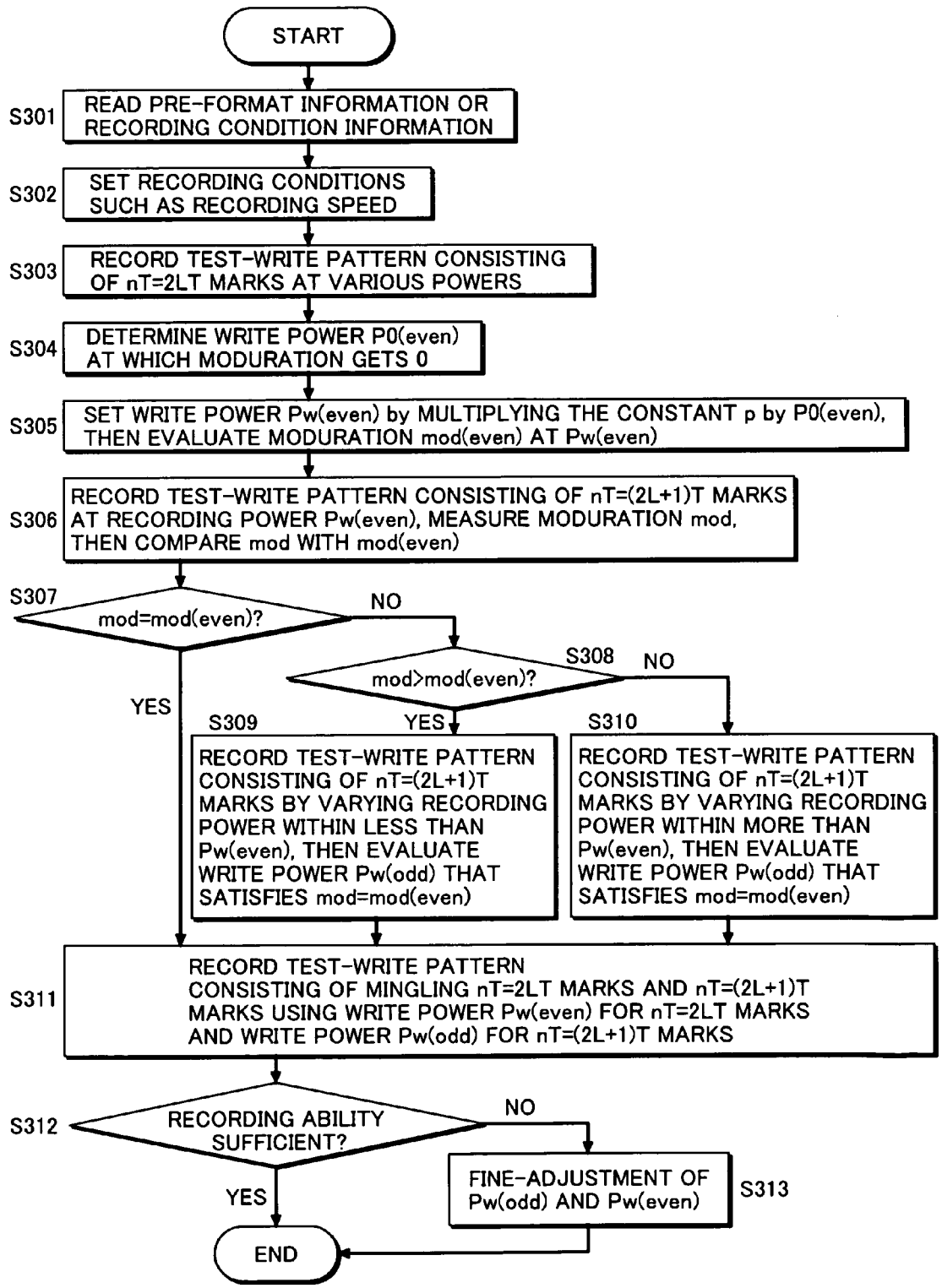
FIG. 6 is a flowchart showing a test writing method according to an embodiment of the present invention.

A flowchart describing the operation of the test writing method according to the present embodiment is shown in FIG. 6, and we will describe the present invention with reference to this figure. The steps S301 through S305 are similar to FIG. 1, and we will omit detailed descriptions thereof. Like in the embodiment 1, in the step S304, we obtained 17.5 mW as the write power P0 (even) at which modulation gets 0. In the step S305, we multiplied P0 (even) with 2.1 for the constant p and obtained 36.8 mW as the write power Pw (even) for even number length marks. In addition, we calculated the modulation mod (even) for a write power of 36.8 mW and obtained mod (even)=59%.

In the following step S306, we recorded by using a test-write pattern composed of odd number length marks represented by nT=(2L+1)T and a write power Pw (even) of 36.8 mW, and when we calculated the modulation mod at the moment, we found that it was 57%. As the modulation mod for a test-write pattern composed of odd number length marks was smaller than mod (even)=59%, we proceeded from the step S308 to the step S310. We recorded a test-write pattern composed of odd number length marks with a power higher than 36.8 mW. At this time, we recorded by changing the write power Pw up to 1.2 times of Pw (even). In the present embodiment, we changed Pw by taking Pw=Pw (even)+Pw (even)*0.02×, (1≦x≦10). As a result, the modulation stood at 59% when Pw=39.7 mW for x=4 and therefore we chose Pw (odd)=39.7 mW. Although the modulation was 59% even when Pw=40.5 mW for x=5, in the present embodiment, we chose the write power at which the desired modulation can be obtained and the one closest to Pw (even) as Pw (odd).

In the step S311 we recorded by using a write pattern for test writing wherein even number length marks and odd number length marks were mixed and by using the write power for odd number length marks Pw (odd) and the write power for even number length marks Pw (even), and in the step S312 we confirmed the recording ability. As a result, we could obtain a practically sufficient jitter 5.4%.

In the present embodiment, we sought the modulation for the write power we had sought by test writing of even number length marks, and set the write power for odd number length marks in such a way that the same modulation may be achieved. On the contrary, even if a modulation sought by test writing an odd number length mark, and the write power of an even number length mark is set in such a way that the modulation may be nearly the same as the modulation sought, the effect of the present invention remains unchanged. And not only in the case of 2T strategy, but also in the case of 3T, 4T strategy and a plurality of other types of write patterns for test writing, the similar effect can be obtained. Specifically, in the case of 3T strategy, the write power P0 (3LT) is sought by using a write pattern formed by nT=3LT marks, P0 (3LT) is multiplied by a constant p to obtain the optimum write power Pw (3LT). The write power Pw (3L−2) and Pw (3L−1) are respectively set in such a way that the modulation existing at the time when a write pattern composed of the nT=(3L−2) marks is recorded and the modulation existing at the time when a write pattern composed of the nT=(3L−1)T marks is recorded may be the same as the modulation mod (3LT) existing at the time when a write pattern composed of the nT=3LT is recorded with Pw (3LT).

In the present embodiment, a test writing starts with a write pattern composed of even number length marks, but this is only an example, and even if a test writing starts with a write pattern composed of odd number length marks, Pw (odd) is sought and then Pw (even) is sought, the effect of the present invention does not change.

Figure 22:
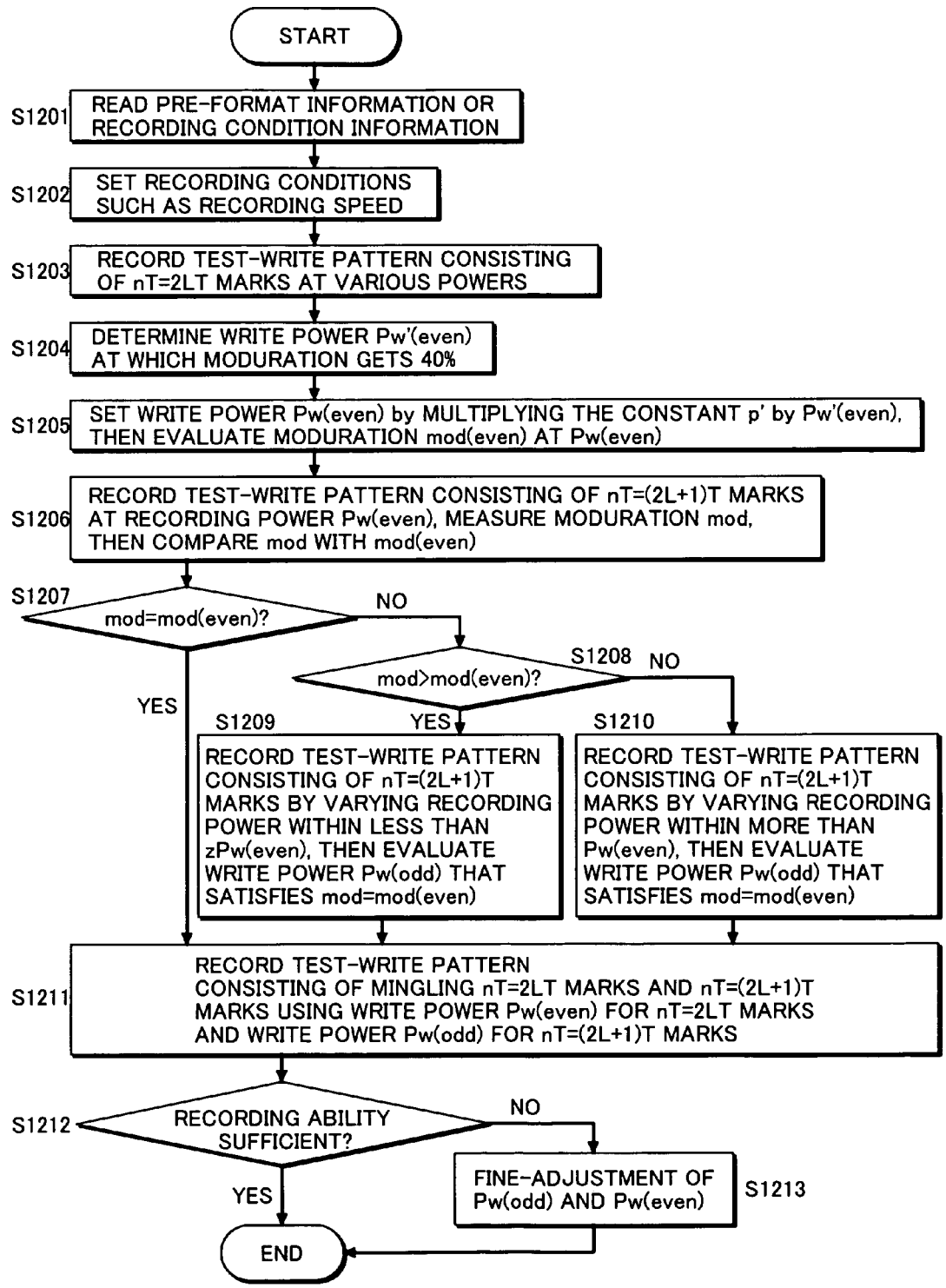
FIG. 22 is a flowchart showing a test writing method according to an embodiment of the present invention.
Figure 23:
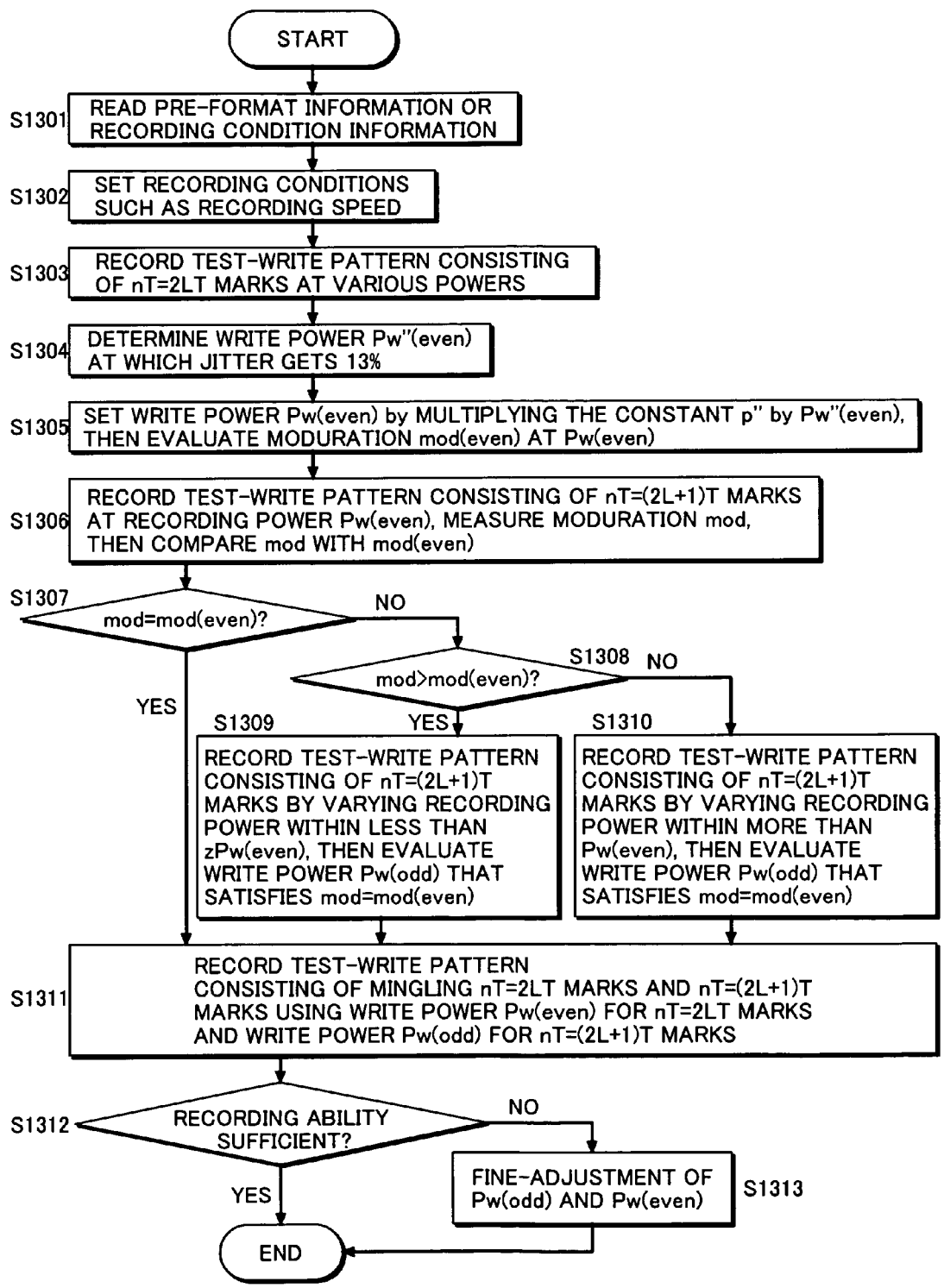
FIG. 23 is a flowchart showing a test writing method according to an embodiment of the present invention.
Figure 29:
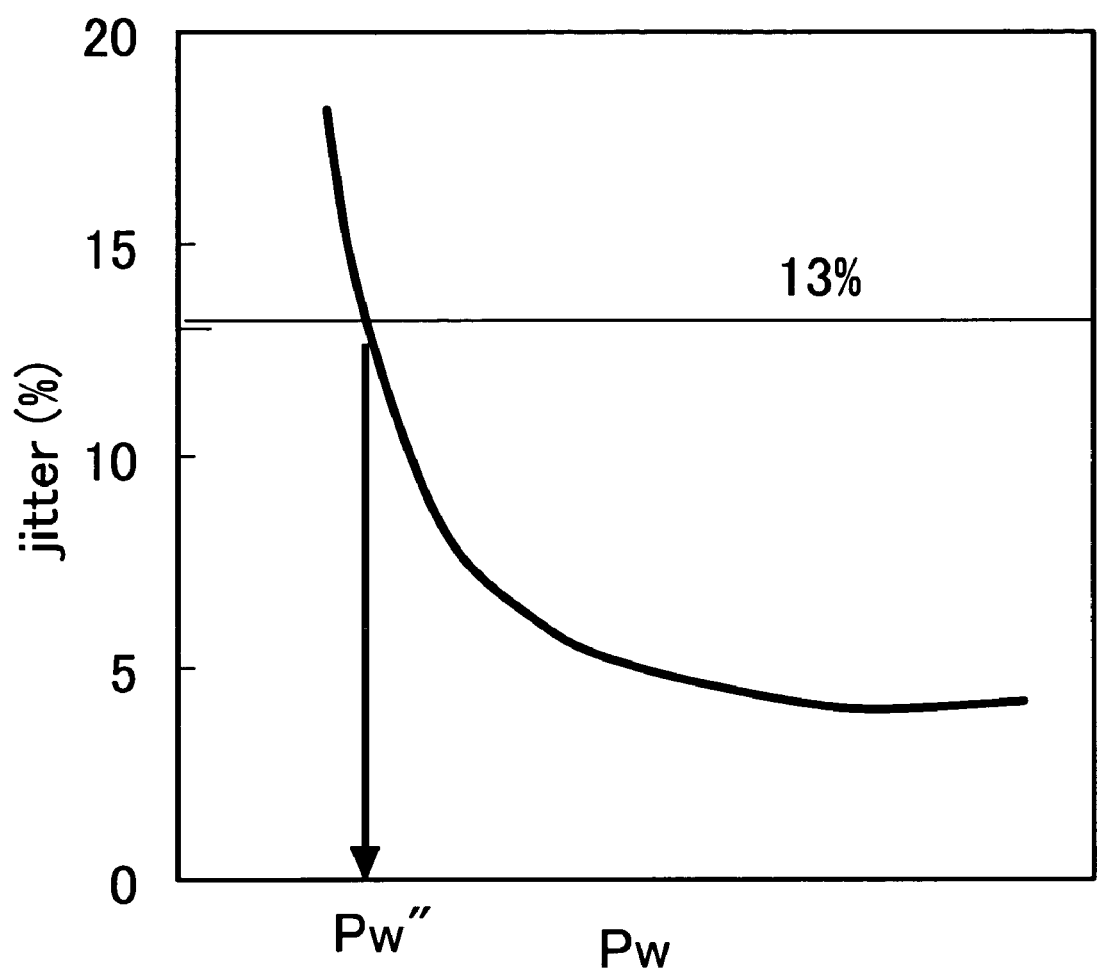
FIG. 29 is a graph showing the relationship between the write power and the jitter according to an embodiment of the present invention.

Further, in the present embodiment, Pw (even) is set by multiplying the write power P0 at which modulation gets effectively 0 by a constant p. However, instead of a modulation that gets 0. a Pw' having the predetermined value between the modulation 0 and the saturated modulation may be sought and the Pw' may be multiplied by the constant p' to obtain Pw. FIG. 22 shows an example thereof. FIG. 22 shows a method of test writing when the predetermined modulation is set at 40%. Further FIG. 23 shows an example of calculating Pw from the write power when the jitter reached the predetermined value. The general relationship between the jitter and the write power is shown in FIG. 29. In the case of FIG. 23, the jitter value existing at the time of recording by changing the write power, and the write power Pw" (even) existing when the jitter reached 13% is multiplied by the constant p" to obtain the write power Pw (even). When a device and a disk similar to those of the present embodiment are used, it is preferable to set the predetermined jitter between 13% and 17%. And when a limit equalizer is used, it is preferable to set the predetermined jitter between 6% and 10%. The constant p" is also a constant set by the disk or drive used, and it is often 1.2≦p"≦2.0.

As described above, the method of determining the writer power of a freely chosen write pattern may be calculated from a write power P0 at which modulation effectively gets 0, or may be calculated by a predetermined modulation (for example 40% as shown in FIG. 22) or may be calculated from the jitter. Obviously, these methods are not limitative, and the write power of any write pattern may be chosen by a predetermined method.

Embodiment 4

In the present embodiment, an example of test writing by the 2T strategy will be described with reference to FIGS. 7 and 8. The drive and optical disk used are the same as those in the embodiment 1, and the description of operations (steps) common with the embodiment 1 will be omitted.

In the embodiment 3, we sought a Pw (odd) that takes nearly the same modulation as mod (even), and then we confirmed the recording ability of the method by using a test-write pattern wherein even number length marks and odd number length marks are mixed. Here, we used the method shown in FIG. 7. In other words, we used the method of obtaining Pw (even), and instead of using a test-write pattern composed of odd number marks, using a test-write pattern wherein odd number length marks and even number length marks are mixed for obtaining directly Pw (odd) with a good recording ability. In the present embodiment, in the step S406 we recorded a write pattern wherein even number length marks and odd number length marks are mixed by varying the write power from 29.4 mW to 44.1 mW centered around the write power for even number length marks Pw (even)=36.8 mW obtained in the step S405. As a result, in the step S407 we obtained 39.0 mW as the Pw (odd) at which the jitter is reduced to the minimum. At this time, the jitter resulting from the recording of a mixed pattern was 5.2%, which was a practically good performance.

Figure 3:
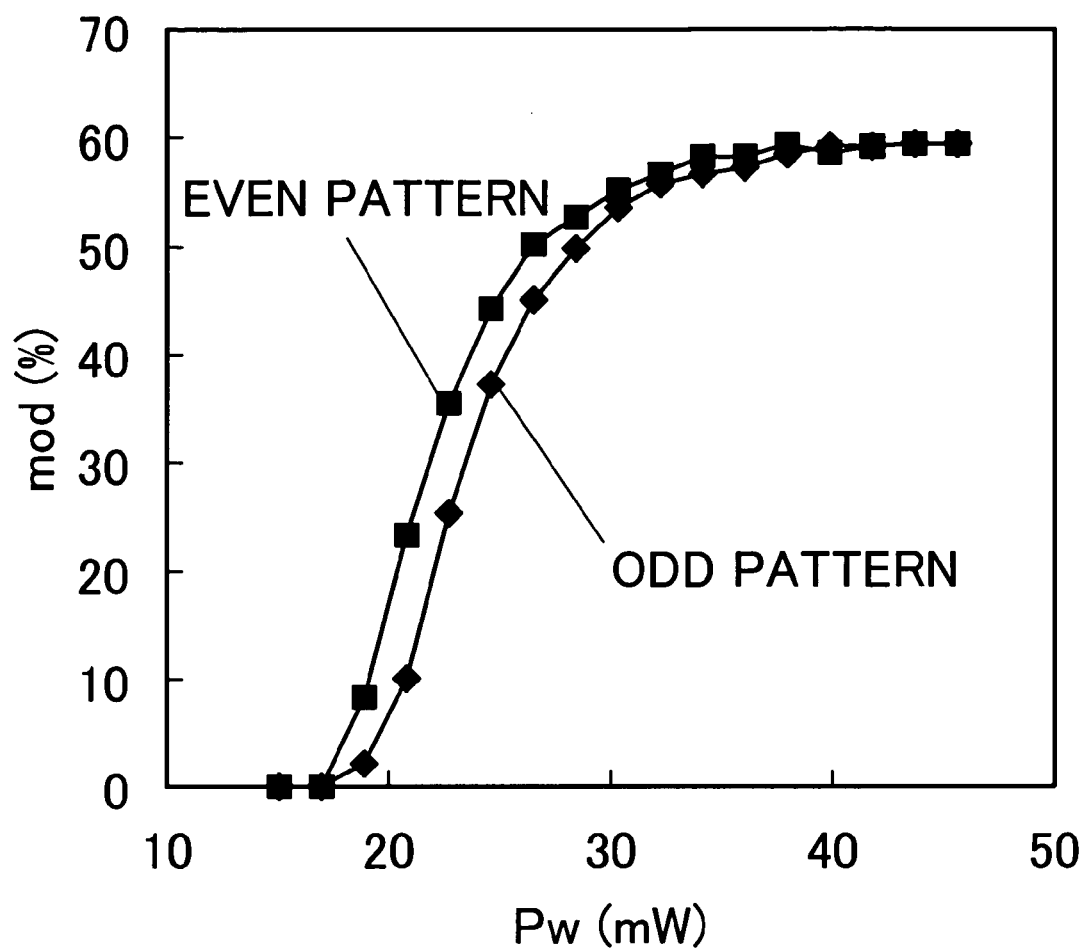
FIG. 3 is a graph showing the relationship between the write power and the modulation according to an embodiment of the present invention.

The write power Pw to be varied in the step S406 was from 0.8 times or more to 1.2 times or less of the write power for even number length marks Pw (even), or a*Pw (even) ≦Pw≦b*Pw(even), and it is preferable that it be 0.8≦a≦1.0, 1.0≦b≦1.2. If a is smaller than 0.8, the insufficiency of the write power is evident and therefore it will be a useless test writing for test writings according to the present method, and it may constitute a waste of the limited drive test zone. And if b is larger than 1.2, as FIG. 3 shows, although the modulation is not very different from the optimum write power, it will constitute an overpower and may give rise to such phenomena as the deterioration of repeated rewriting capacity. Thus, it is not preferable.

Figure 7:
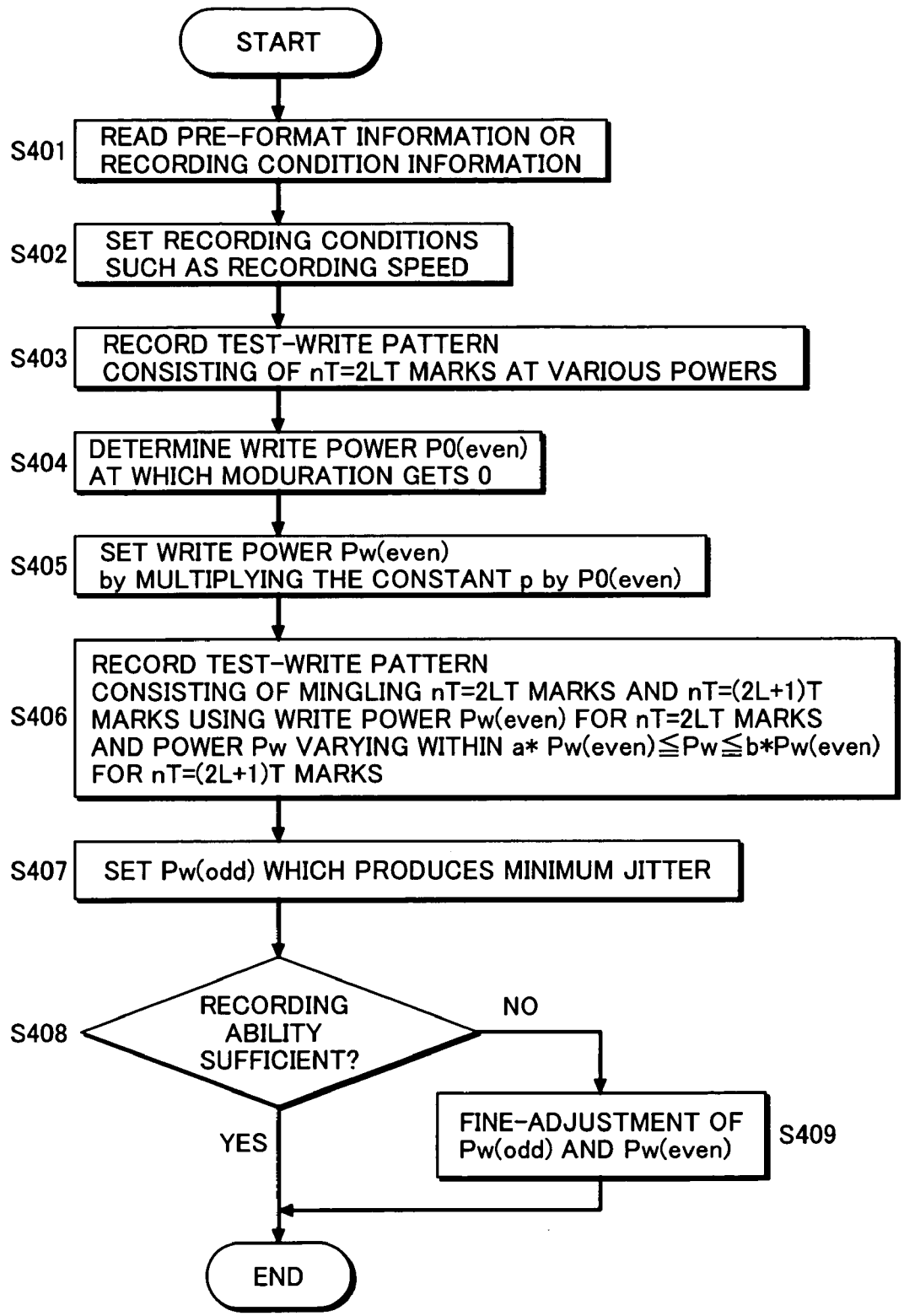
FIG. 7 is a flowchart showing a test writing method according to an embodiment of the present invention.
Figure 8:
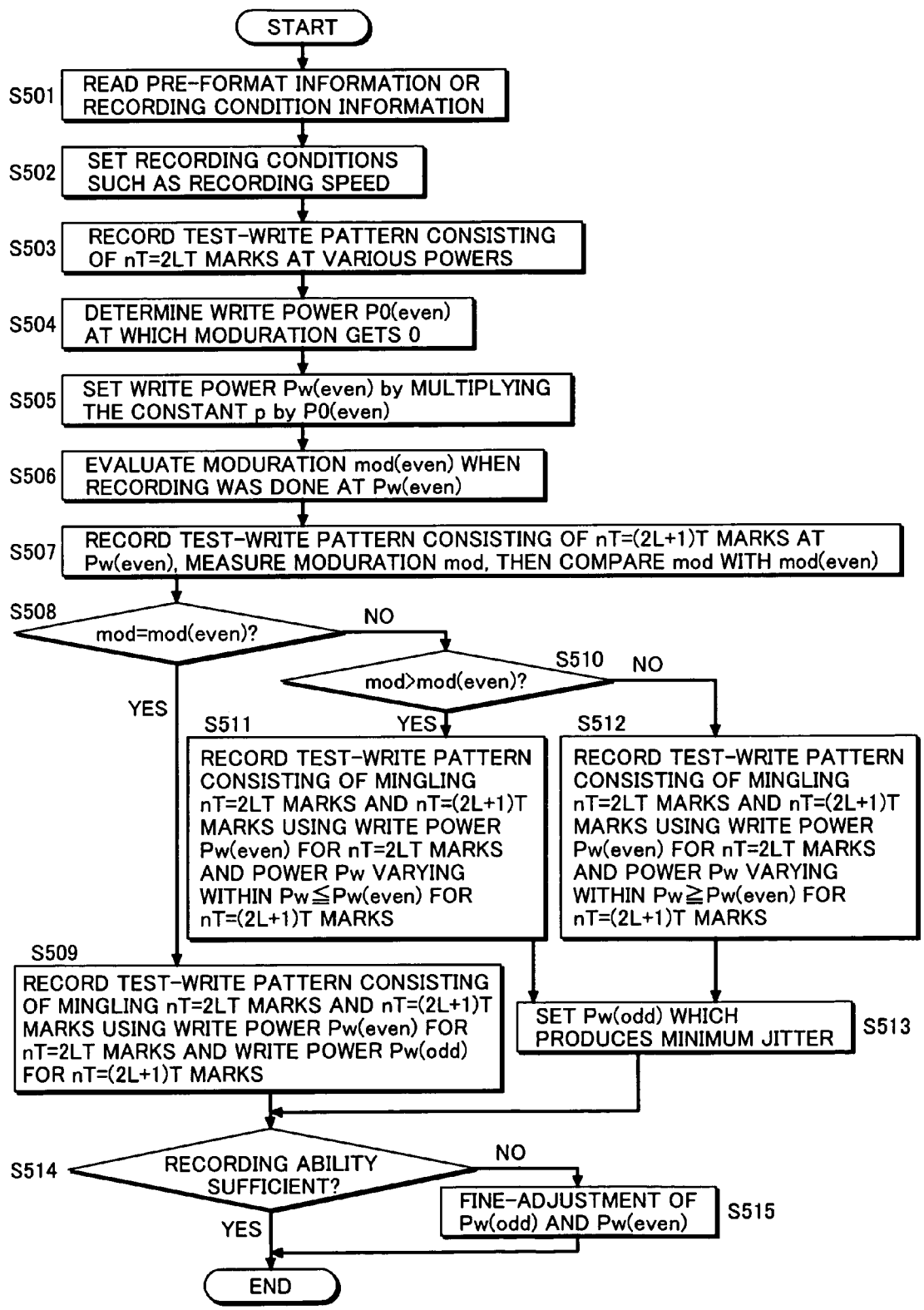
FIG. 8 is a flowchart showing a test writing method according to an embodiment of the present invention.

FIG. 8 shows an example of the means for reducing the frequency of test writings conducted in FIG. 7. According to the test writing shown in FIG. 8, a or b of FIG. 7 corresponds with the case of 1.0 and therefore the zone required for test writing can be reduced, and the time required for test writing can be curtailed.

FIG. 7 or 8 indicates the write power to be chosen for minimizing the jitter. And it may be the central value within the range of write power where the jitter may be less than the predetermined value of, for example, 13%. Or it may be PRML instead of the jitter index. The present invention does not limit the index of recording ability to jitters.

Figure 24:
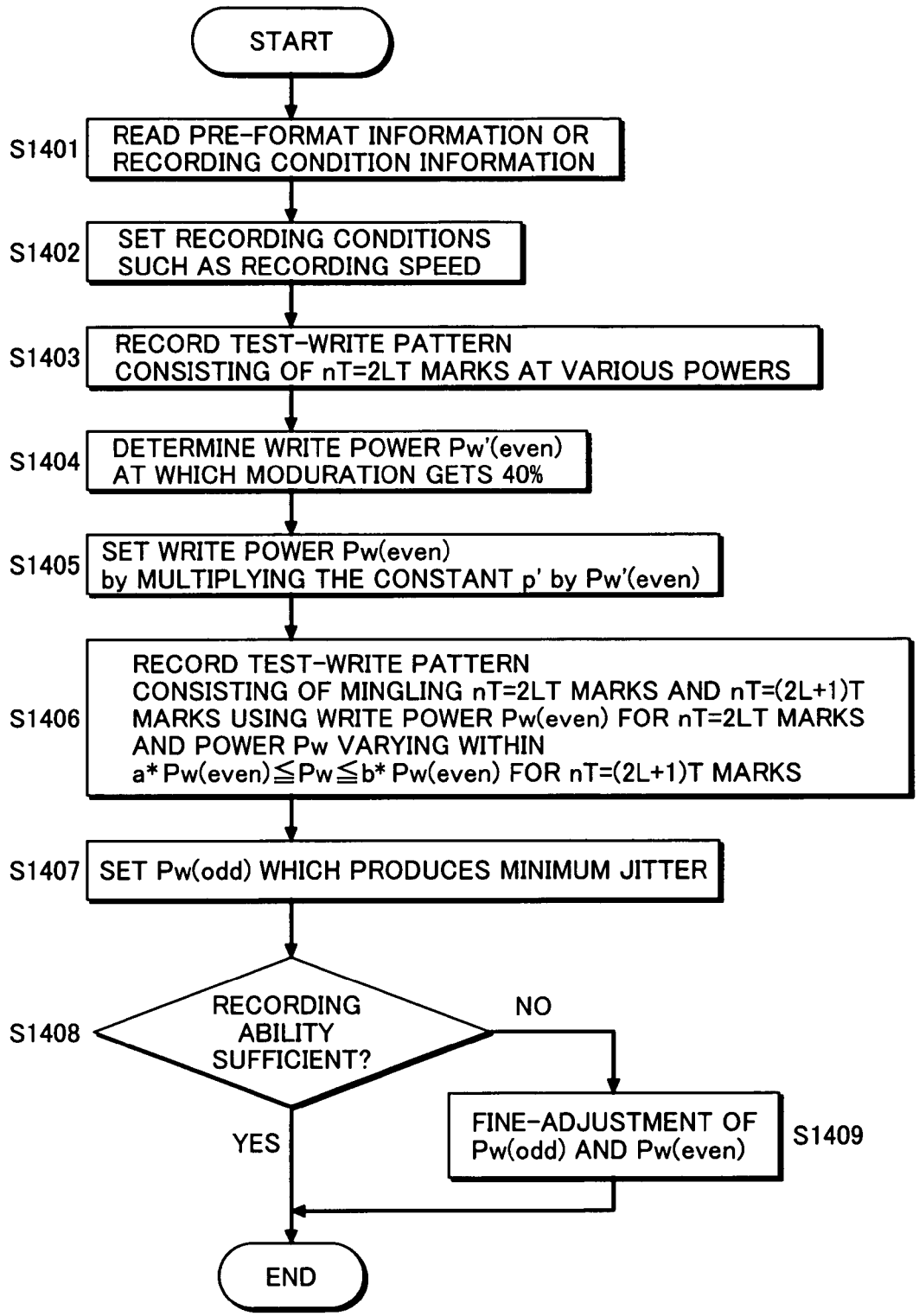
FIG. 24 is a flowchart showing a test writing method according to an embodiment of the present invention.

And in FIGS. 7 and 8, Pw (even) is calculated based on P0 (even). But the means of calculating Pw (even) is not limited to this. FIG. 24 shows an example of calculating Pw by seeking the write power Pw' by which the modulation reaches 40% and by multiplying this Pw' with a constant p'. Thus, the means of calculating the write power in any freely chosen write pattern among a plurality of write patterns is not limited to only one, and it is preferable to choose one according to the drive, medium and specific use.

Embodiment 5

Figure 9:
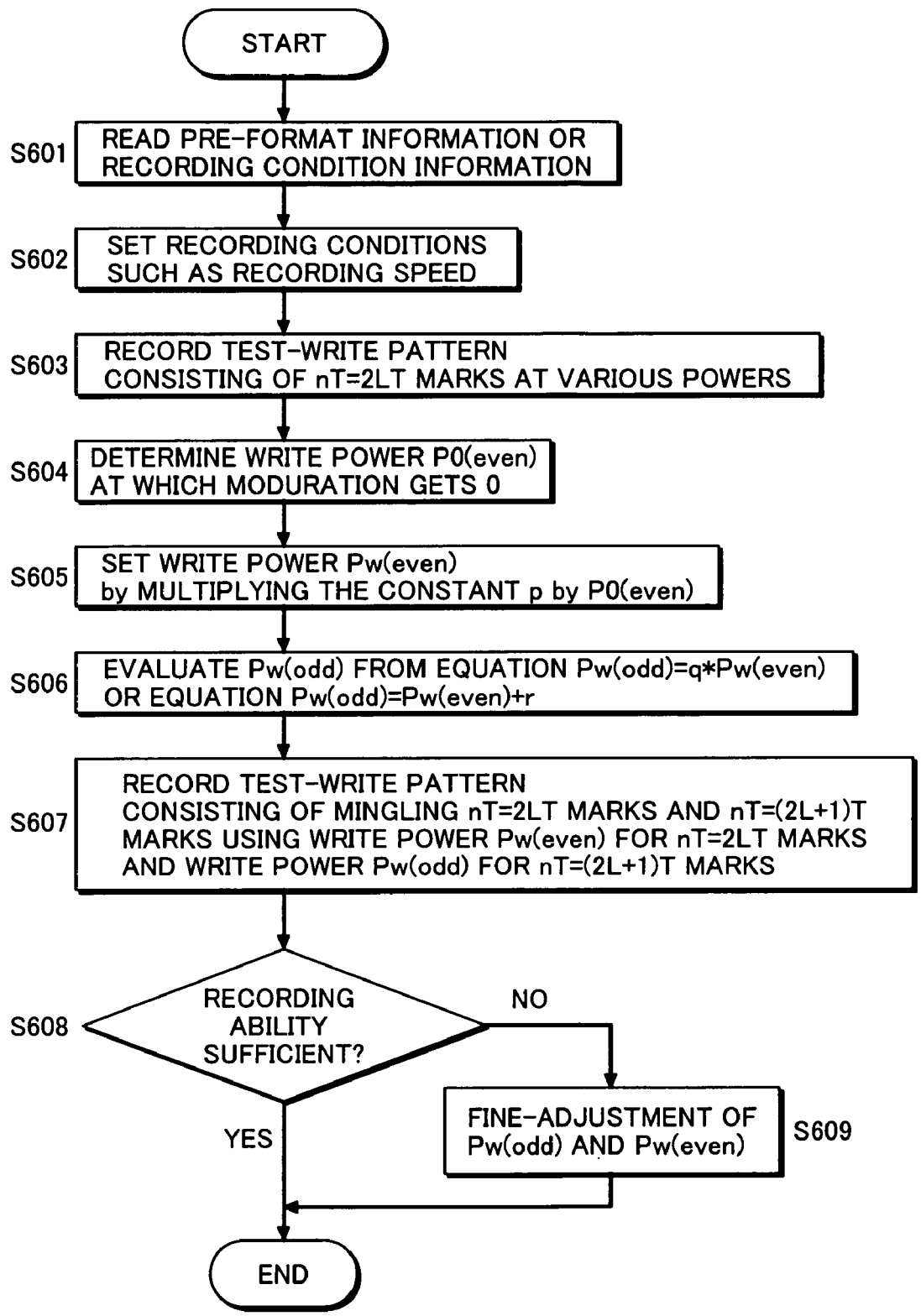
FIG. 9 is a flowchart showing a test writing method according to an embodiment of the present invention.

In the present embodiment, we will describe an example of test writing suitable for a medium wherein a certain relationship exists between the write power used for even number length marks and the write power used for odd number length marks with reference to FIG. 9. The drive, optical disk used and the like are similar to those of the embodiment 2, and its linear velocity is set at 34.9 m/s. And here we used the 2T strategy and not the 3T strategy used in the embodiment 2.

The steps S601 to S603 are similar to the embodiment 2 except that the 2T strategy is used for the write strategy and are therefore omitted here. By recording in the step S604 a write pattern for test writing composed of even number length marks, we obtained 20.0 mW as a write power P0 (even) at which the modulation gets 0. Then, in the step S605 we multiplied P0 (even) by a constant p of 2.8 to obtain 56.0 mW as the write power Pw (even).

Then, in the step S606, the write power for odd number length marks is set. For the combination of the disk and the recording conditions used in the present embodiment, the equation of Pw (odd)=q×Pw (even) is suitable, and we obtained the best recording performance when the constant q was set at 0.96. However, in the present embodiment where an equation of Pw (odd)=q×Pw (even) is suitable, depending on the disk structure and the write strategy used, the equation of Pw (odd)=Pw (even)+r may sometimes be preferable. The question of which equation to choose may be determined at the time of shipping the drive in advance by the type of the medium. Or, the suitable equation may be chosen when the medium is loaded for the first time.

After setting in the step S606 the Pw (odd) at 53.8 mW from the equation of Pw (odd)=0.96×Pw (even), in the step S607 we used the write power for even number length marks as Pw (even) and the write power for odd number length marks as Pw (odd) for recording a test-write pattern wherein odd number length marks and even number length marks are mixed and evaluated the recording ability (step S608). And as a result, we obtained a practically passable recording ability of jitter=7.8%.

The establishment of a correlation by means of a mathematical formula between the write power Pw (odd) for recording a write pattern composed of odd number length marks and the write power Pw (even) for recording a write pattern composed of even number length marks simplifies the process of test writing because only one of the write patterns needs to be tested, and thus the time required for test writing can be substantially curtailed. The values of the constant q and the constant r may be chosen just before shipping the drive. Or the values of q and r may be obtained by learning when the medium is loaded for the first time, and the medium ID and q and r may be correlated. When we conducted test writings by combining several types of media and write strategies, we obtained good recording abilities within a range of 0.9 to 1.1 for the constant q and the range of −3.0 to 3.0 for the constant r.

Figure 25:
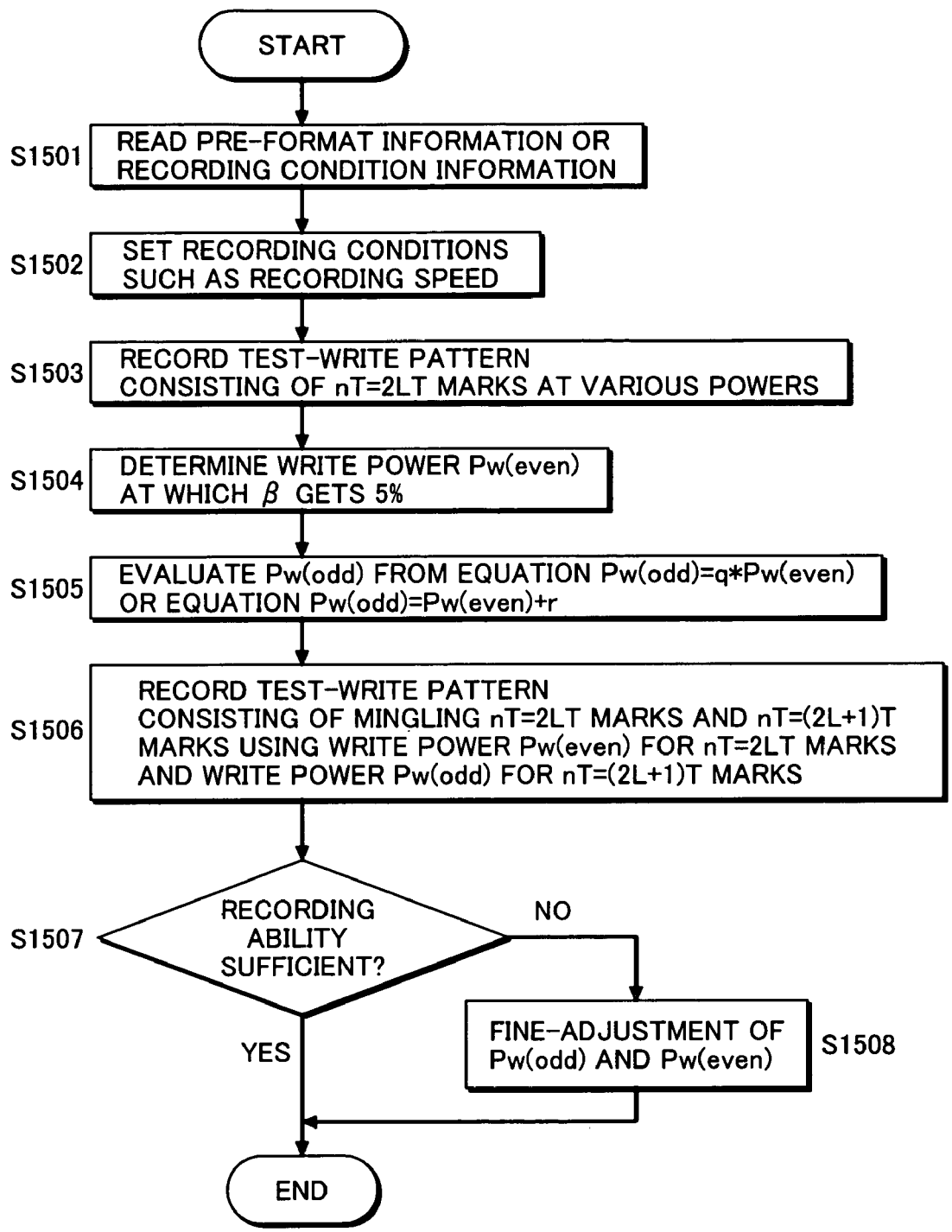
FIG. 25 is a flowchart showing a test writing method according to an embodiment of the present invention.

In the present embodiment, we calculated Pw (even) based on P0 (even), but the means of calculating Pw (even) is not limited to this. The jitter performance may be chosen as an index, and PRML may be chosen as the basis of such calculation. FIG. 25 shows an example of seeking a write power Pw (even) at which β is brought to approximately 5%. It is preferable to apply the present method to media wherein β changes sharply in relation to variations in the write power. In FIG. 25 the value of β is set at 5%. However, depending on the property of the medium and drive, it is preferable to set the optimum value of β. The present method of calculating Pw based on the value of β is advantageous in that the write power can be obtained with a high precision in comparison with the method of calculating from P0 shown in FIG. 9, because the desired write power can be directly obtained. Thus, the means of calculating the write power for any freely chosen write pattern from among a plurality of write patterns is not limited to only one, and it is preferable to choose one depending on the drive, medium and use thereof.

In the present embodiment, we used the 2T strategy, but the 3T strategy and the 4T strategy are also effective test writing methods. The method of correlating a plurality of write patterns by a mathematical formula, conducting test writings on a write pattern and seeking the write power of other write patterns by a predetermined mathematical formula is advantageous in that the time required for test writing and the drive test zone can be curtailed.

Embodiment 6

In the embodiments 1-5, we sought the optimum write power by using modulation for an index. In the present embodiment, we will describe a test writing method of setting the optimum write power not by using modulation but by using β.

Figure 10:
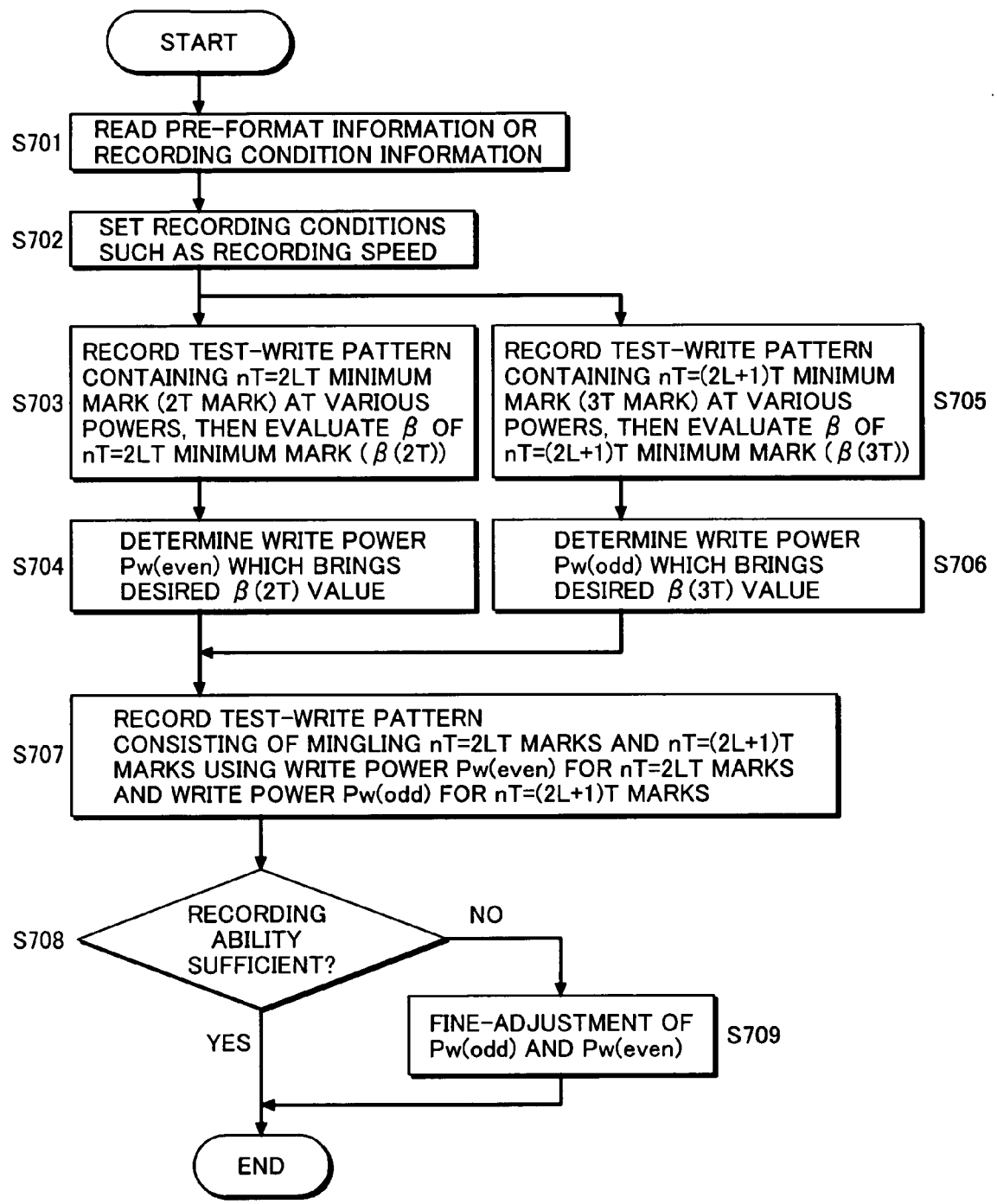
FIG. 10 is a flowchart showing a test writing method according to an embodiment of the present invention.
Figure 11:
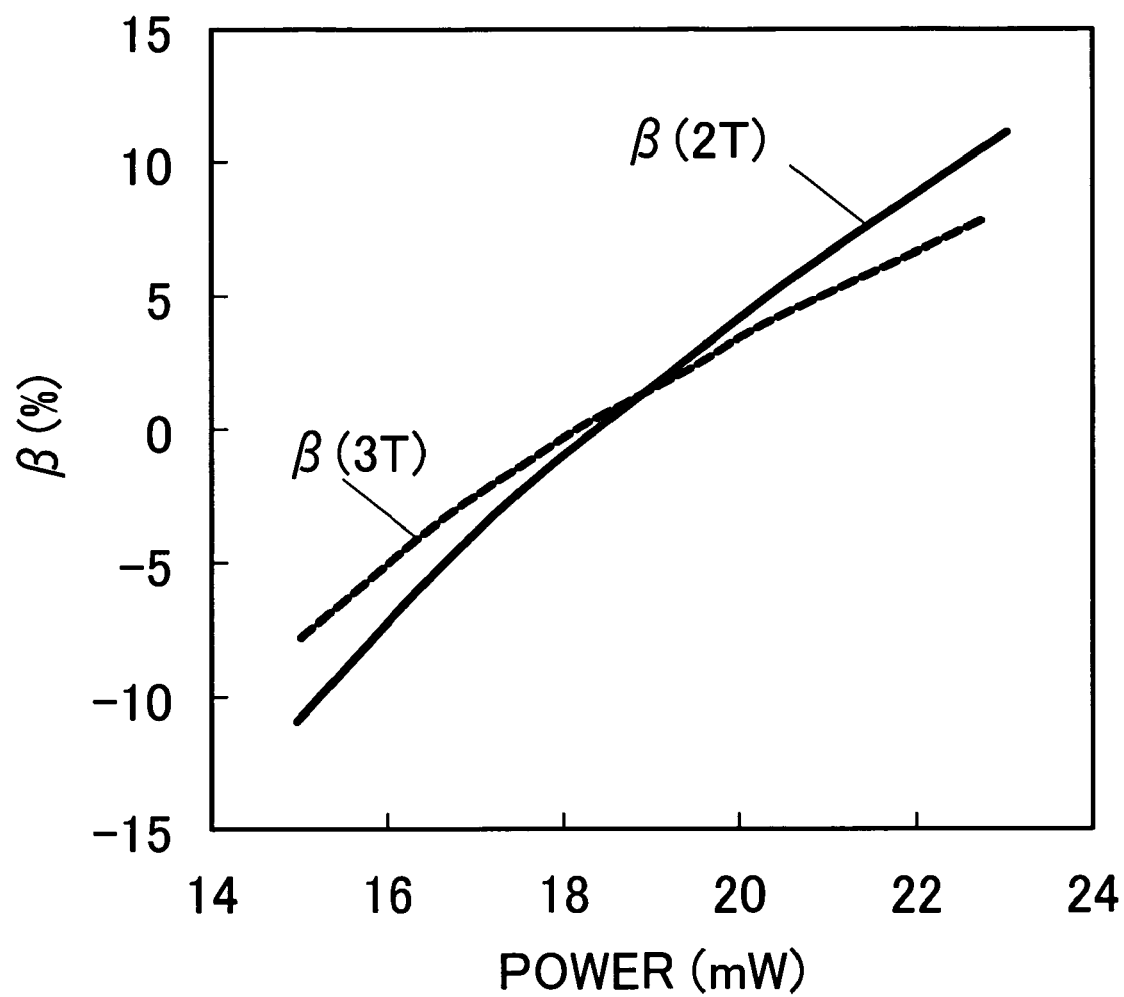
FIG. 11 is a graph showing the relationship between the write power and β according to an embodiment of the present invention.

In the present embodiment, we used a blue light source compatible disk capable of 6× recording. We set its linear velocity at 31.7 m/s and used a write strategy composed of 2T-9T marks. A flowchart describing the operation of the test writing method according to the present invention is shown in FIG. 10. To begin with, in the step S701 we read the recommended write power and other recording conditions recorded on the disk, and obtained 18 mW for the write power (Pw), 3.4 mW for the erase power (Pe), and 0.1 mW for the bias power (Pb). In the step S702, we set the laser power conditions in the vicinity, and in the steps S703 and S705 we conducted test writings on the disk. As for the laser power conditions, we fixed the Pb value at 0.1 mW, fixed the Pe and Pw ratio, and varied Pw by the step of 0.2 mW between 15 mW and 21 mW. At this time, in the step S703, we used test-write patterns including 2T mark, the shortest mark among the even number length marks, and in the step S705 we used test-write patterns including 3T mark, the shortest mark among the odd number length marks. Specifically, the patterns used in the step S703 are write patterns composed of 2T marks and 8T marks and spaces of length varying from 2T to 9T, and the patterns used in the step S705 are write patterns composed of 3T marks and 8T marks and spaces of length varying from 2T to 8T. Thus, the arrangement of a common mark length (here 8T mark) in the write pattern is advantageous in that β of the 2T and 3T marks constituting respectively the smallest mark can be calculated on the basis of the same 8T mark. In the steps S703 and S705 we recorded by changing the write power and calculated respectively β(2T) whichs β of the 2T mark and β(3T) whichs β of the 3T mark. FIG. 11 shows the relationship between the write power and β(2T) and β(3T). Thus, the relationship between β and the write power generally differs depending on the length of marks.

In the present embodiment, taking the desired β as 0, we set in the steps S704 and S706 the write power at which β(2T)=0 at Pw (even)=18.2 mW, and the write power at which β(3T)=0 at Pw(odd)=18.4 mW. Then, in the step S707 we recorded a test-write pattern (confirming pattern) wherein nT=2LT marks and nT=(2L+1) T marks are mixed at 18.2 mW for the write power Pw (even) for nT=2LT marks and at 18.4 mW for the write power Pw (odd) for nT=(2L+1) T marks. As a result, the jitter stood at 4.9% representing a good value presenting practically no problem.

Figure 12:
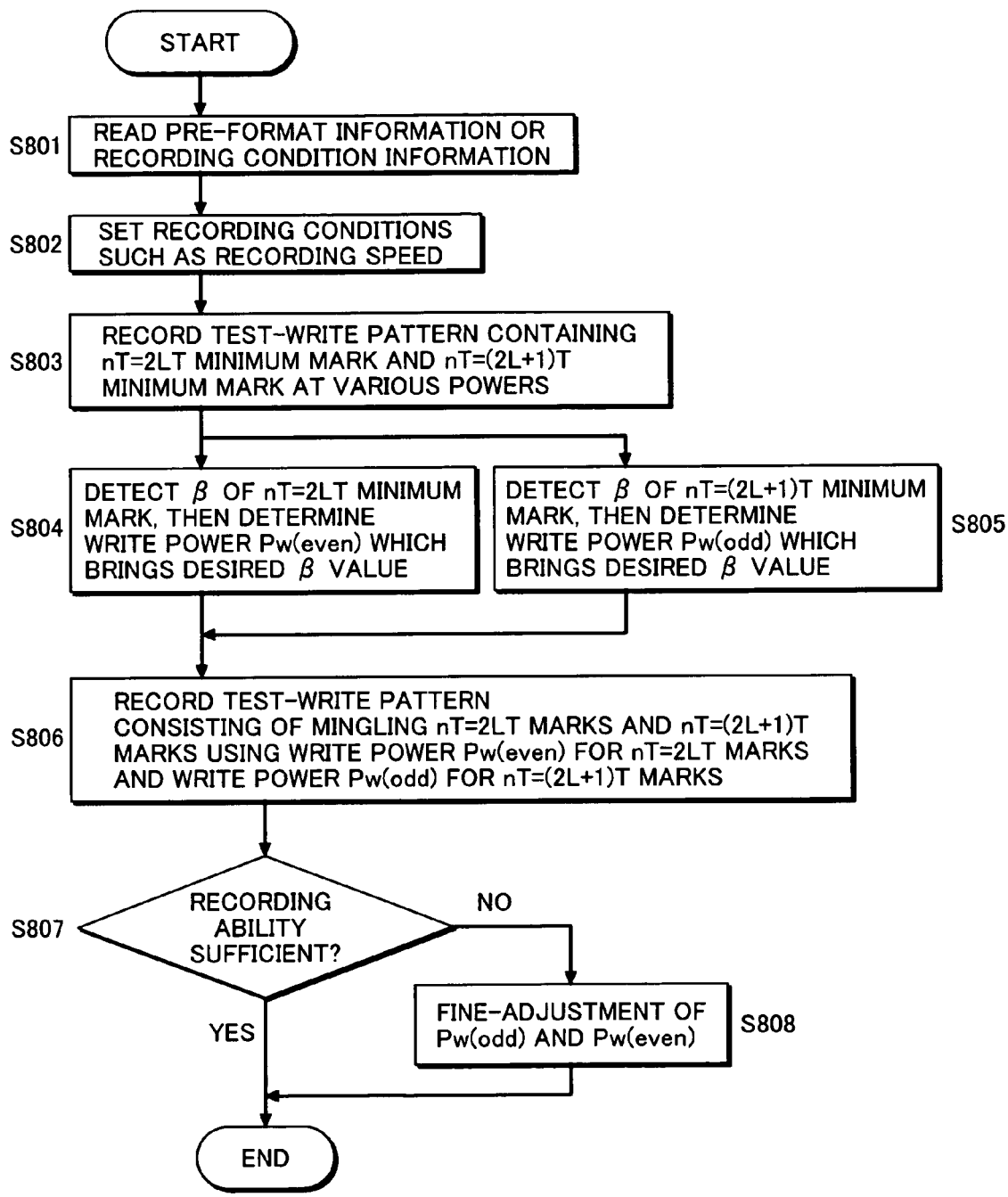
FIG. 12 is a flowchart showing a test writing method according to an embodiment of the present invention.

In the present embodiment, we test wrote separately the odd number minimum length mark and the even number minimum length mark. However, as FIG. 12 shows, the write power for odd number length marks Pw (odd) and the write power for even number length marks Pw (even) at which β(2T) and β(3T) get the desired value may be sought by using write patterns including 2T and 3T, for example random patterns, recording them by changing write power, and thus detecting and obtaining separately β(2T) and β(3T).

In the test writing method shown in the present embodiment, it is important to set respectively the write power in such a way that the asymmetry of the minimum mark and the next large mark or β or γ may be nearly equal, and the difference of the modulation method of whether the 2T mark is the minimum or the 3T mark (the dimension of the minimum mark) is not important. Therefore, even the modulation method wherein the 3T mark becomes the minimum does not change the effect of the present invention. Here, the expression "nearly equal" does not mean precisely the same value, and for example the term "asymmetry" means an allowable range of ±1%. The nearest asymmetry in the range of setting stage of the write power or β or γ may be chosen for the setting.

Embodiment 7

In each of the embodiments 1-6, we have described an example of test writing methods in the case where the laser driver of each drive can choose any one of the desired multiple levels of write power Pw. Here, we will show an example of test writing in the case where the laser driver has not the desired set number of Pw levels.

Figure 13:
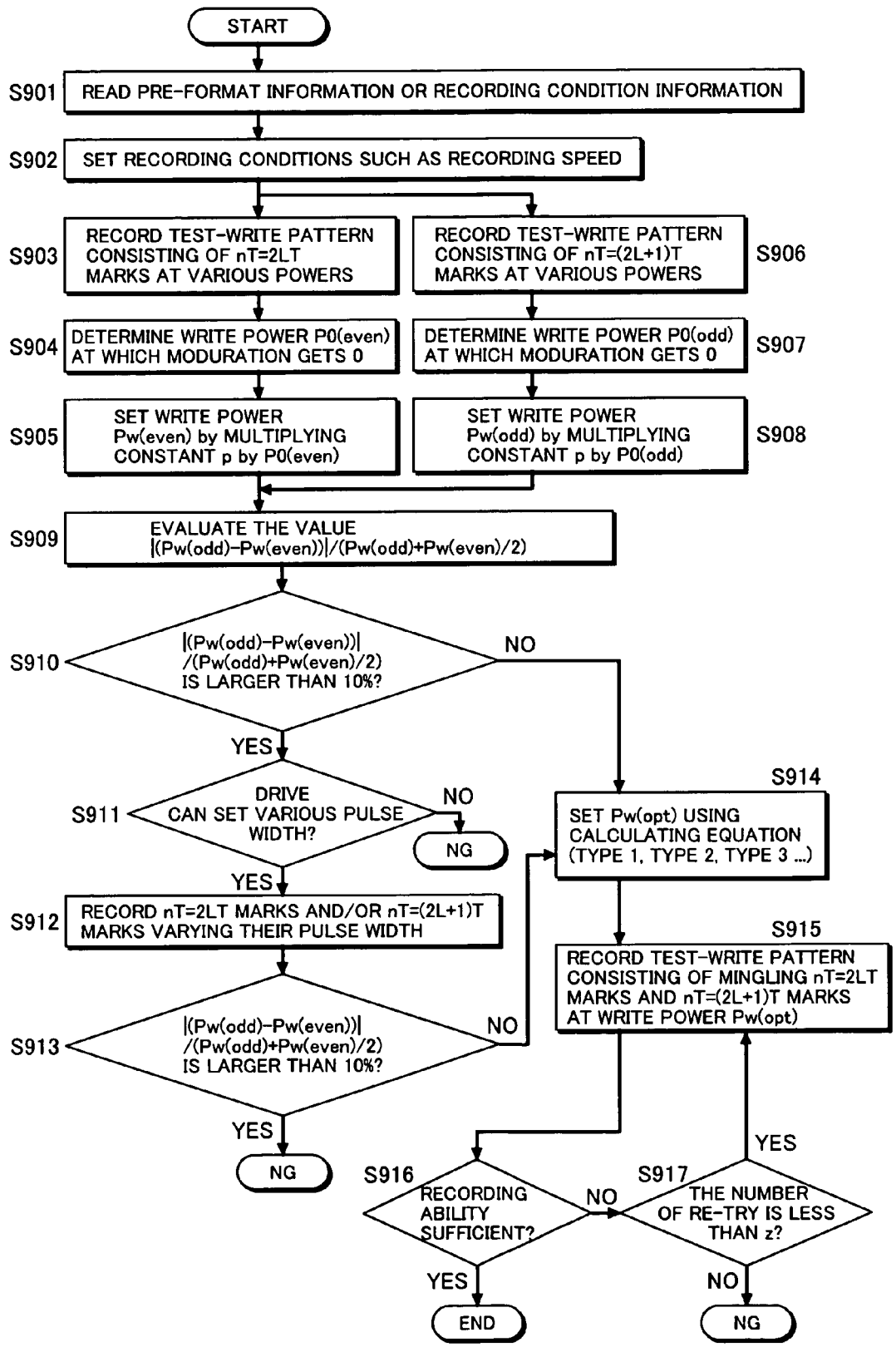
FIG. 13 is a flowchart showing a test writing method according to an embodiment of the present invention.

A flowchart describing the operation of the test writing method according to the present embodiment is shown in FIG. 13, and we will explain with reference to the figure. As for the optical disk, we use the same one as that of the embodiment 1, and for recording, reproduction and measurement, we used a drive provided with a semiconductor laser with a wavelength of 660 nm. On this drive, only a value of Pw level can be set. As the steps S901-S908 of FIG. 13 are identical to the steps S101-S108 of FIG. 1, the description here is omitted. In the step S905, by the steps up to S908, we obtained a write power for even number length marks Pw (even) of 36.8 mW and in the step S908 we obtained 38.9 mW as the write power for odd number length marks Pw (odd).

In the present embodiment, taking the value obtained by dividing the difference between Pw (even) and Pw (odd) by the mean value of these write powers as the parameter x, we decided to choose the method of test writing by the magnitude of its value. In the step S909, we divided |Pw (even)−Pw (odd)|whichs the difference between Pw (even) and Pw (odd) by the mean value of two write powers represented by (Pw (even)+Pw (odd))/2. As a result, the parameter x according to the present embodiment turned up to be 5.5%, and following the determination of the step S910, we proceeded to the step S914.

In the step S914, we used the calculation equation to calculate the write power Pw (opt). The calculation equations used here include for example the following equations.

Type 1. Pw (opt)=Pw (even)
Type 2. Pw (opt)=Pw (odd)
Type 3. Pw (opt)=(Pw (even)+Pw (odd))/2
Type 4. Pw (opt)=Max (Pw (even), Pw (odd))
Type 5. Pw (opt)=Min (Pw (even), Pw (odd))

Type 1 is a calculation equation attaching importance to the even number length marks, and is suitable for the case where the modulation method with 2T mark being the minimum mark is adopted. Type 2 is a calculation equation attaching importance to the odd number length marks and is suitable for the case where the modulation method with 3T mark being the minimum mark is adopted. And Type 3 takes the average write power of Pw (even) and Pw (odd) as the optimum write power Pw (opt) and is advantageous in that the variation at the time of recording is reduced. Type 4 is a calculation equation of choosing a write power whichever is larger among the Pw (even) and the Pw (odd) for the optimum power Pw (opt).

Type 4 is suitable in the case where importance is attached to S/N such as in the case of using a medium with a low S/N ratio hoping to obtain a gain in modulation. On the contrary, Type 5 is a calculation equation of choosing a write power whichever is smaller among the Pw (even) and the Pw (odd) for the optimum power Pw (opt), This is suitable for a medium wherein marks cannot be recorded widely due to a high level of crosstalk from the adjacent tracks. In other words, when jitter deterioration is severe due to crosstalk, the calculation formula of Type 5 is suitable. These calculation equations may be chosen according to the type of the drive or disk used. And the calculation equations listed above are only some of the examples, and the use of equations for seeking the optimum write power Pw (opt) from among the Pw (even) and the Pw (odd) is within the scope of application of the present invention.

In the present embodiment, we used Type 3. Since Pw (even)=36.8 mW and Pw (odd)=38.9 mW the optimum write power Pw (opt) will be Pw (opt)=(36.8+38.9)/2=37.9 mW. Using Pw (opt) calculated in the step S914, we conducted in the step S915 test writings by using random patterns, and the jitter obtained was 6.5%, representing a practically passable recording ability.

In the present embodiment, as the criteria of judgment in the step S910, we chose that of whether the parameter x was larger than 10% or not. However, in order to insure the safety of records, the threshold value may be set at for example 5%. It is preferable to set the threshold value according to the drive and the medium used. When the threshold value is set at 5%, in the present embodiment, in the step S910 of FIG. 13 a determination of "Yes" is given, and the process will proceed to the step S911. As the drive used in the present embodiment has no pulse variable function, a "No" determination is given in the step S911, it will be NG, or write error. The occurrence of such a write error may apparently seem disadvantageous for the user. However, as a result of irradiating an inadequate write power in an attempt to record, data recorded before or data contained in the management area may be destroyed. It is an important process to prevent such data destruction, and can protect recorded information constituting the assets of users. FIG. 13 showed an example of NG when a No determination is given in the step S911. However, when a No determination is given in the step S911, the process of proceeding to the step S914 to find Pw is acceptable as a matter of course. In such a case, instead of keep trying to find Pw until a sufficient recording ability can be obtained in the step S916, it is preferable to set a frequency of retrials z in the step S917. The frequency of retrials may be determined according to the drive and the medium used. In the present embodiment, we chose z=1.

And in the present embodiment, in the step S909 we sought the parameter x from the following formula.

$$x=|Pw(\text{even})-Pw(\text{odd})|/(Pw(\text{even})+Pw(\text{odd}))/2$$

However, the present invention is not limited to the formula shown above, and any mathematical formula capable of showing in any form the difference between the optimum power of even number length marks and the optimum power of odd number length marks may be adopted.

In the present embodiment, as the drive was not pulse width variable type, a No determination was given in the step S911. When a pulse width variable type drive is used, it will be possible to vary pulse width in the step S912. For example, as in the present embodiment, in the case of Pw (even)<Pw (odd), it is preferable to expand the pulse width of odd number length marks in write once media. Generally in write once media marks grow larger proportionately to the energy irradiated. Therefore, it is possible to reduce write power by expanding pulse width, and as a result, a power close to Pw (even) may be used. On the contrary, the narrowing of the pulse width of Pw (even) produces the same effect. Further, in rewritable media it is better to narrow the pulse width of odd number length marks. In rewritable phase-change media, the crystallization of molten zone called "re-crystallization" occurs. If pulse width is large, crystallization intensifies, and the injection of too much energy can reduce amplitude. In such a case, it is possible to increase amplitude by narrowing pulse width. It is preferable to change pulse width by the step of approximately 1 ns. This will be equal to the time roughly corresponding to the rising time or falling time of laser. Or pulse may be made variable by dividing Tw by n so that it may be shown for example as Tw/16, and in either case the lot variation of the medium or the individual variation of the laser driver may be absorbed.

Figure 26:
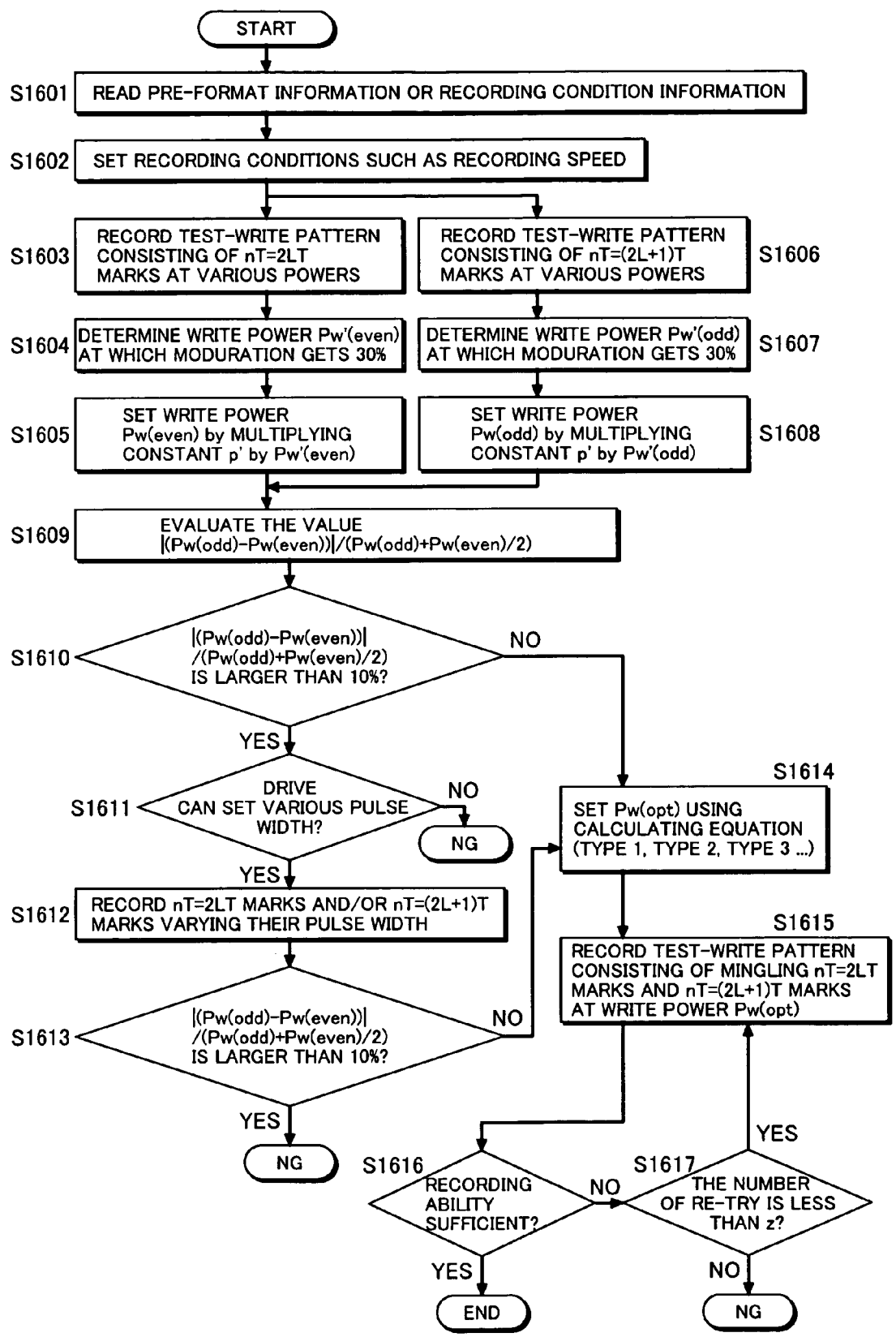
FIG. 26 is a flowchart showing a test writing method according to an embodiment of the present invention.

In the present embodiment, we set Pw based on the write power P0 at which modulation gets effectively 0. However, instead of modulation 0, the method of seeking Pw by seeking a write power Pw' at which the predetermined modulation is obtained and multiplying the Pw' by a constant p' may be used. An example thereof is shown in FIG. 26. FIG. 26 shows a test writing method applicable when the predetermined modulation is set at 30%. The present embodiment describes the case where the laser driver has no desired number of write power level set, and the test writing method shown in FIGS. 13 and 26 may be used as a test writing method on a drive on which the desired write power level can be set. In this case, when a low quality optical disk medium incapable of assuring proper recording ability is inserted in the drive, it will be a method of ejecting the same as NG.

Embodiment 8

In the embodiment 7, we described the case where the 2T strategy is used on a drive having only a level of Pw. In the present embodiment, we will describe the case where the 3T strategy is used on a drive having two levels of Pw. On a drive on which two Pw levels can be set, in the 2T strategy write power can be allocated respectively on the even number length marks and on the odd number length marks. However, when the 3T strategy is used, it will not be possible to allocate write power levels respectively on three types of write patterns. Even in such a case, it will be possible to set write power by a process similar to FIG. 13. For example, we will describe an example of using the 3T strategy on a drive on which two write powers, Pw (A) and Pw (B), can be set with reference to FIG. 14.

As for the optical disk, we used a 10× rewritable DVD and as for the drive, we used the same drive as the embodiment 1. As the steps S1101-S1111 are the same as those shown in the flowchart described in FIG. 2, they are omitted here. As the drive used in the embodiment 2 can have three write power Pw levels, we set respectively the optimum power of three types of write patterns obtained in the steps S1105, S1108 and S1111, and we could use them in actual recording. However, as we use a drive that can set only two Pw levels here, we cannot allocate the optimum power level on all the three types of write patterns. Therefore, in the step S1112, we sought the mean power Pw(y) of the optimum write power for three types of write patterns, and in the step S1113 we judged the write pattern A which will be the farthest value from Pw(y) among the optimum write powers of the three types of write patterns Pw (3LT)=57.7 mW, Pw((3L−1)T)=54.0 mW, and Pw((3L−2)T)=56.3 mW. In the present embodiment Pw(y)

=56.0 mW, and the difference between the write power of each write pattern and Pw(y) is 1.7 mW for Pw(3LT), 2.0 mW for Pw(3L−1)T), and 0.3 mW for Pw ((3L−2)T) and we found that the write pattern A having the farthest write power is the write pattern consisting of the nT=(3L−1) T marks (step S1113).

Then in the step S1114, we set the write power Pw (A) of the write pattern A at 54.0 mW as the write power Pw((3L−1) T) of the write pattern composed of nT=(3L−1)T marks, and in the step S1115 we recorded by changing power the write pattern B consisting of nT=3LT marks and nT=(3L−2)T marks. As a result, in the step S1116 we obtained 56.7 mW as the Pw (B) at which the jitter is reduced to the minimum. The jitter at that time was 6.8 mW. In the step S1117, we set the nT=(3L−1) T marks at 54.0 mW as the write power Pw (A), the nt=3LT marks and the nT=(3L−2) T marks at 56.7 mW as the write power Pw (B), and recorded the random patterns. As a result, the jitter stood at 7.2 mW and we could obtain a practically passable recording ability. In the step S1118, a "Yes" judgment was given, and the test writing came to a close.

In the step S1116 (FIG. 14) shown in the present embodiment, we designated Pw at which the jitter was reduced to the minimum value for Pw (B). However, for the sake of convenience, the mean value of the optimum powers of two types of write patterns may be used. Furthermore, the same effect can be achieved by using the level jitter applied to PRML. Or, the calculation equations shown by Type 1 through Type 5 shown in the embodiment 7 may be used. Or, a write power Pw (B) at which β of the respective minimum mark of nT=3LT marks and that of the minimum mark of nT=(3L−2) marks nearly coincide may be set (FIG. 15). In the present embodiment wherein a modulation method with the minimum mark of 3T and the maximum mark of 14T is used, in specific terms the minimum mark for nT=3LT marks will be a 3T mark and the minimum mark for nT=(3L−2) T marks will be a 4T mark. The selection method of Pw (B) in the step S1116 may be determined by taking into account the compatibility between the medium used and the drive.

Figure 14:
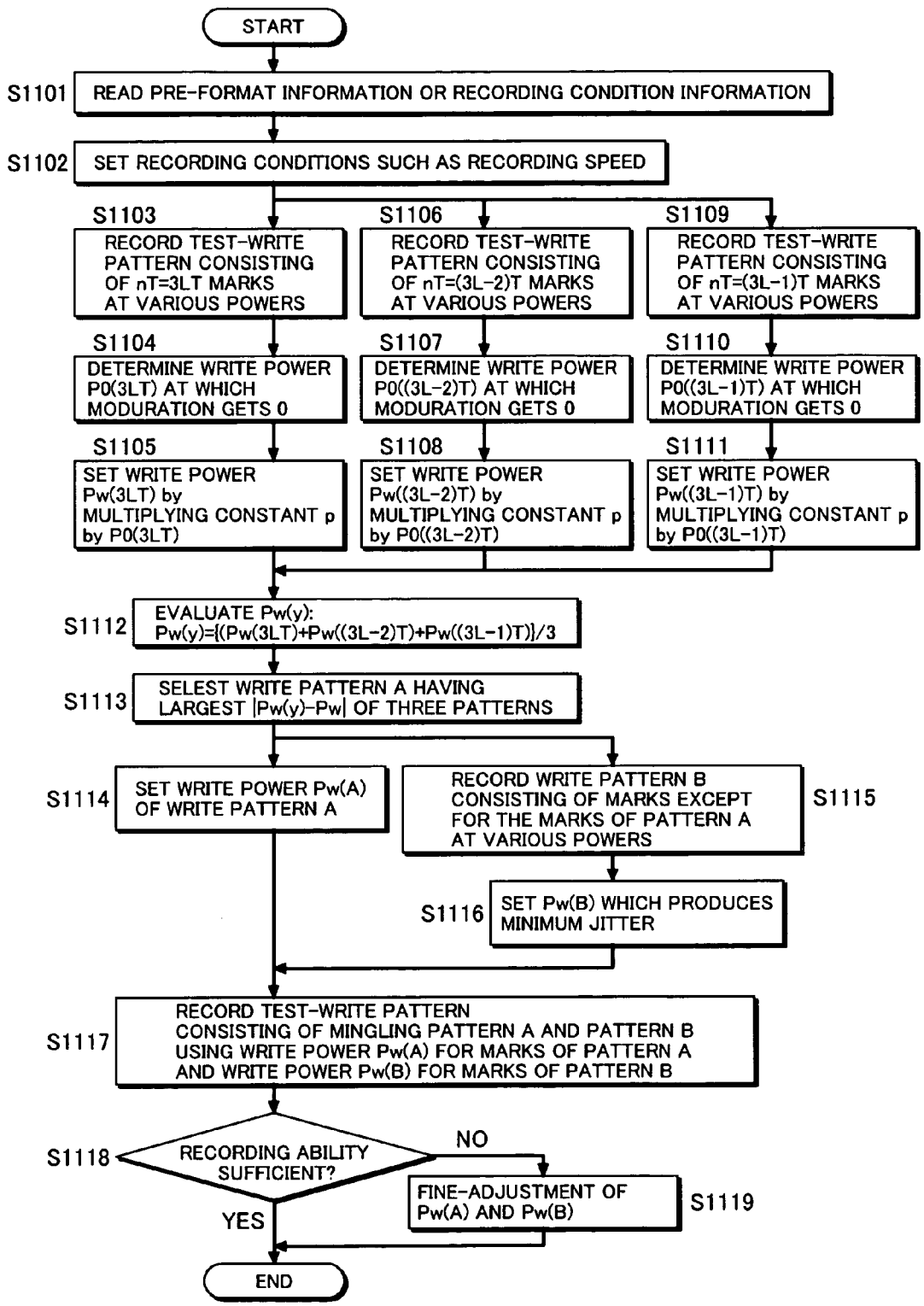
FIG. 14 is a flowchart showing a test writing method according to an embodiment of the present invention.
Figure 15:
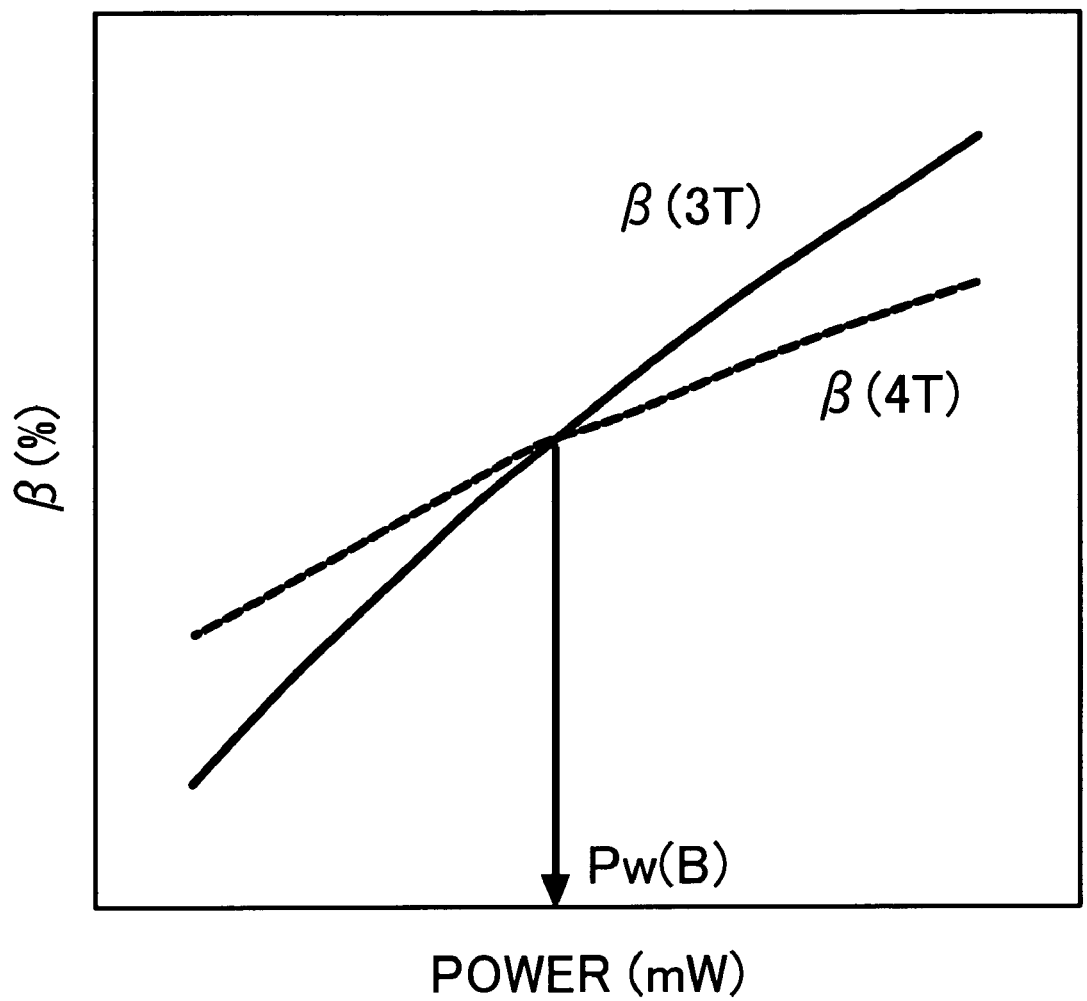
FIG. 15 is a graph showing the relationship between the write power and β according to an embodiment of the present invention.
Figure 27:
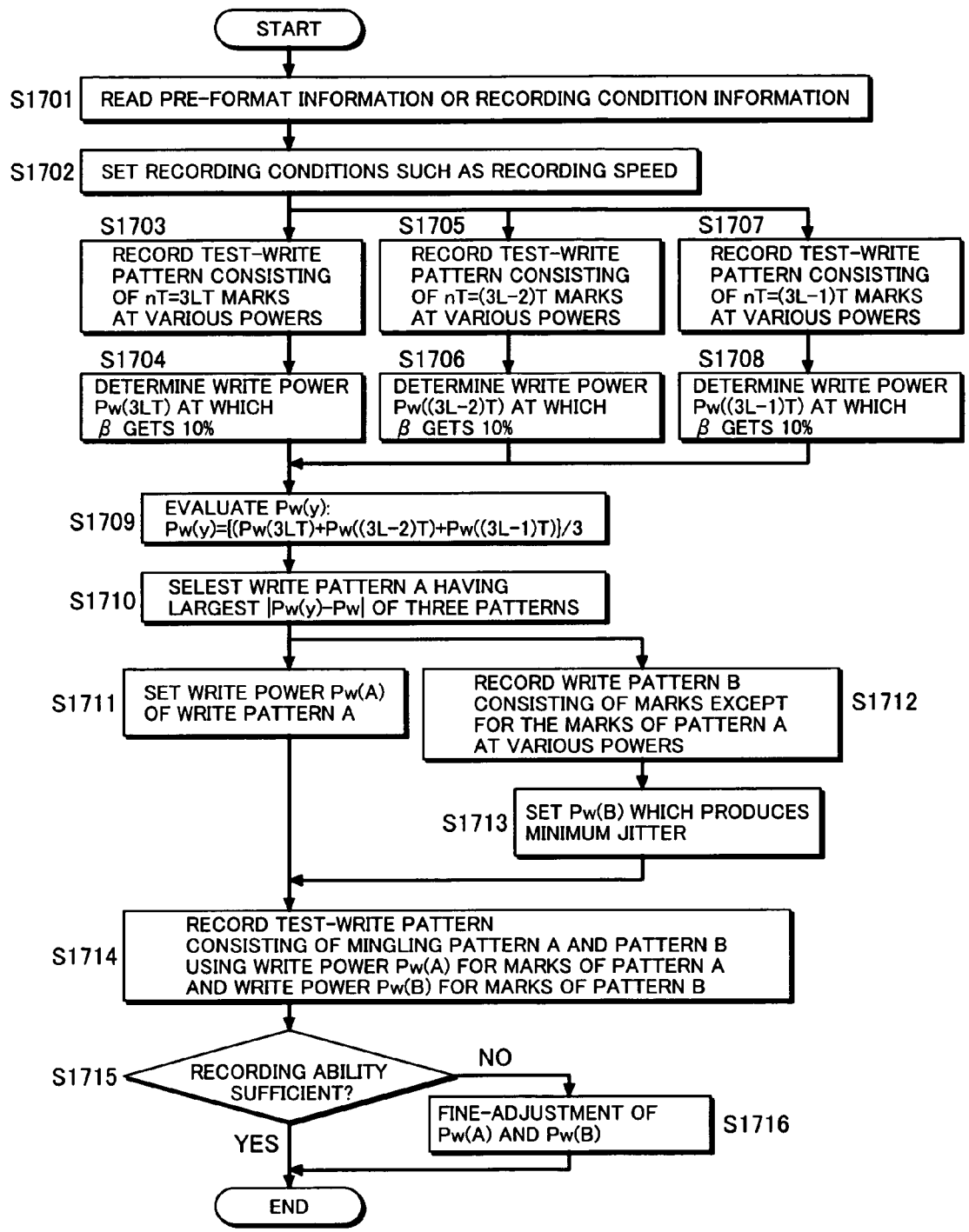
FIG. 27 is a flowchart showing a test writing method according to an embodiment of the present invention.

While FIG. 14 showed the method of seeking the write power Pw from the write power P0 at which the modulation gets 0, FIG. 27 shows an example of test writing in case where the write power at which β gets approximately 10% is set as Pw. For the test-write patterns used in the steps S1703, S1705 and S1707 of FIG. 27, we used three types of write patterns consisting of a write pattern formed by nT=3LT marks, a write pattern formed by nT=(3L−2) T marks and a write pattern formed by nT=(3L−1) T. However, the present invention is not limited to these test-write patterns. For example, test-write patterns consisting of the shortest mark of each write pattern and the common mark length of each write pattern shown, for example, in the embodiment 6, specifically, in the step S1703, a write pattern composed of 3T marks being the shortest mark, 11T marks being the common mark, and spaces of a length ranging from 3T to 11T, in the step 1705, 4T marks being the shortest mark and 11T marks being the common mark, and write patterns composed of 3T-11T length spaces, and in the step S1707 a write pattern composed of 5T marks being the shortest mark, 11T marks being the common mark, and spaces of a length ranging from 3T to 11T may be used. And in FIG. 27, the write power with β accounting for 10% is used as Pw for each write pattern. However, the optimum value of β may vary depending on the medium or the drive. It is preferable to set the value of β according to the type of the medium or the characteristics of the drive.

Embodiment 9

Figure 16:
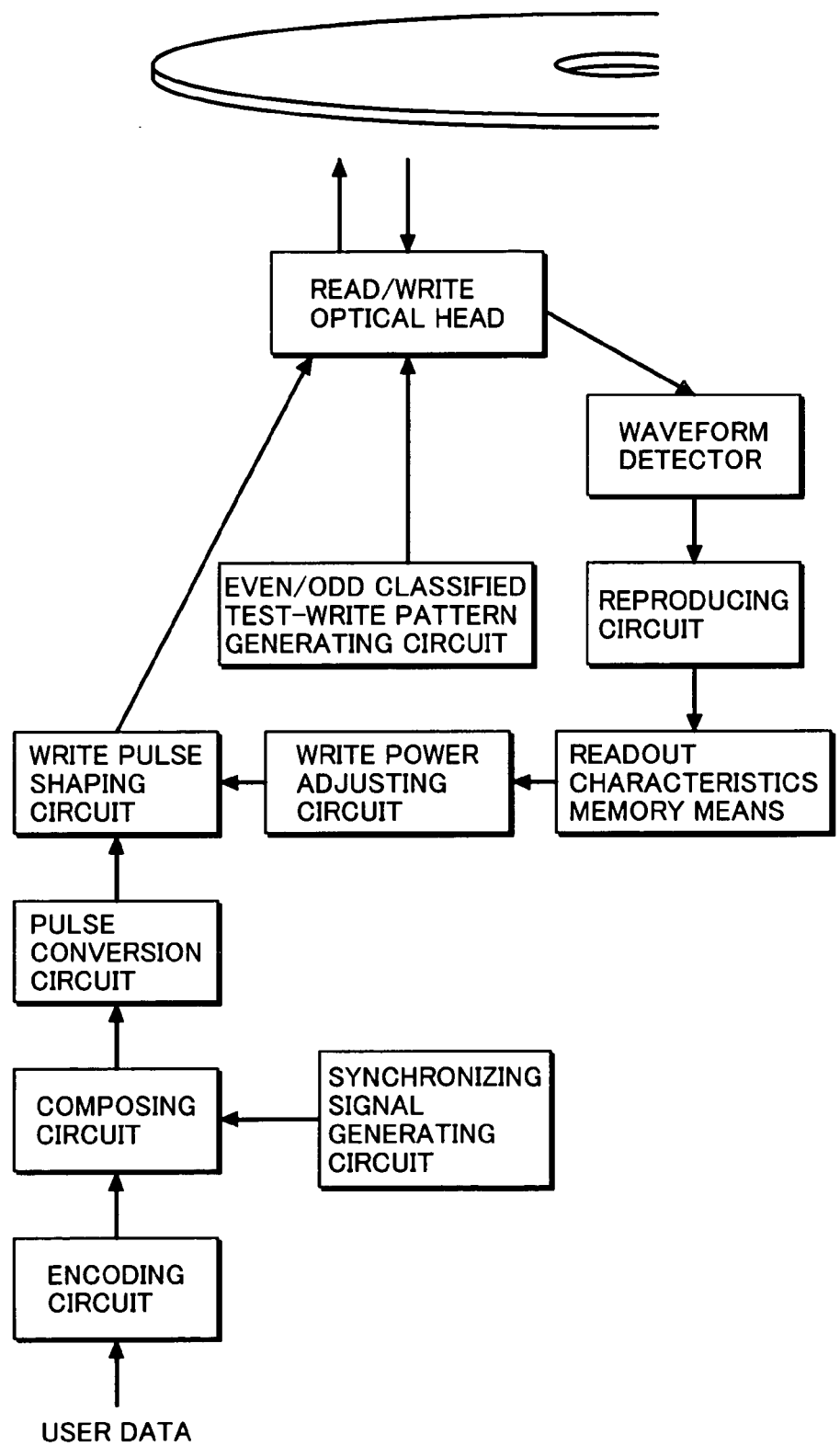
FIG. 16 is an illustration showing an example of device used in the present invention.
Figure 17:
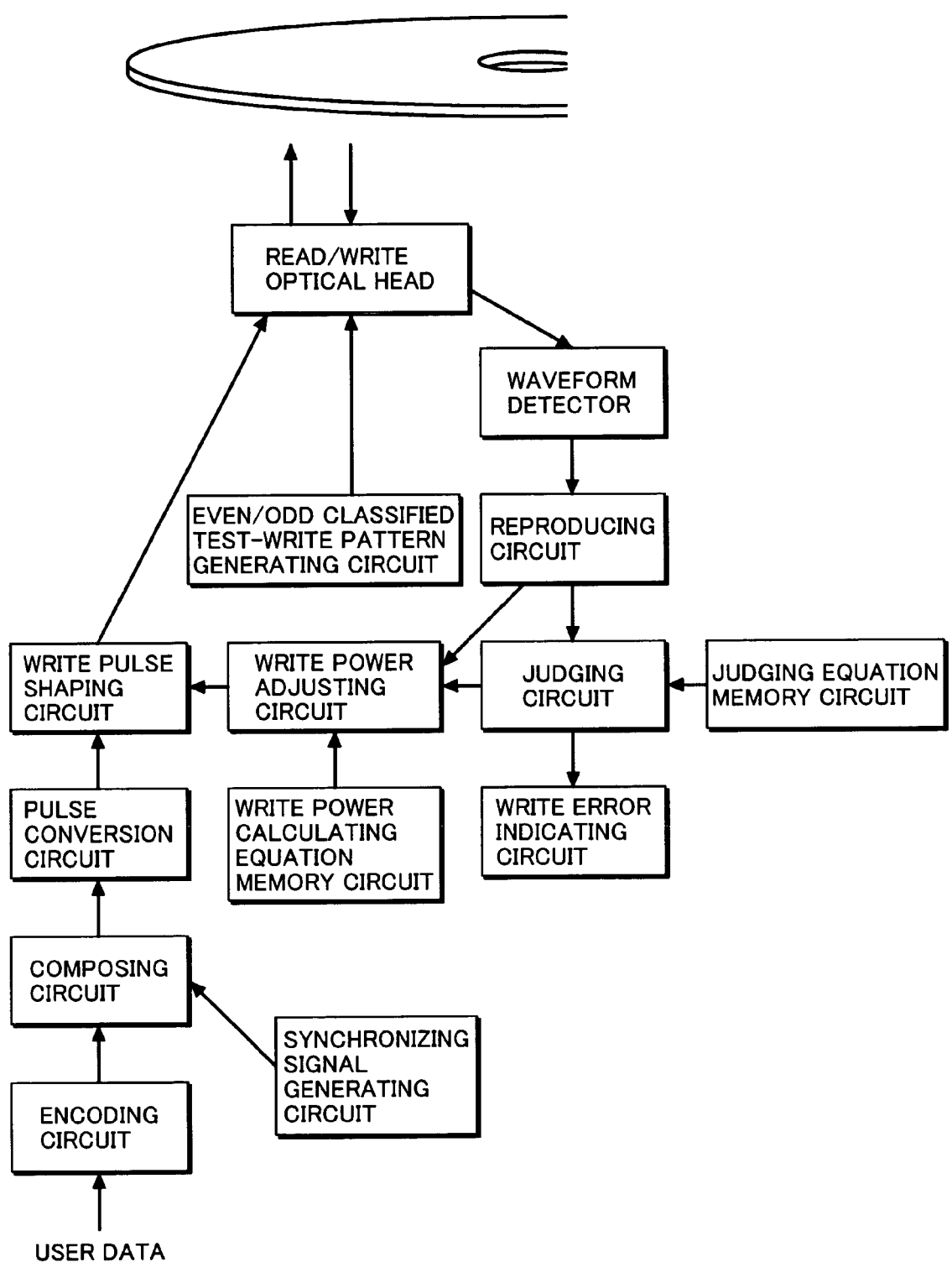
FIG. 17 is an illustration showing an example of device used in the present invention.
Figure 18:
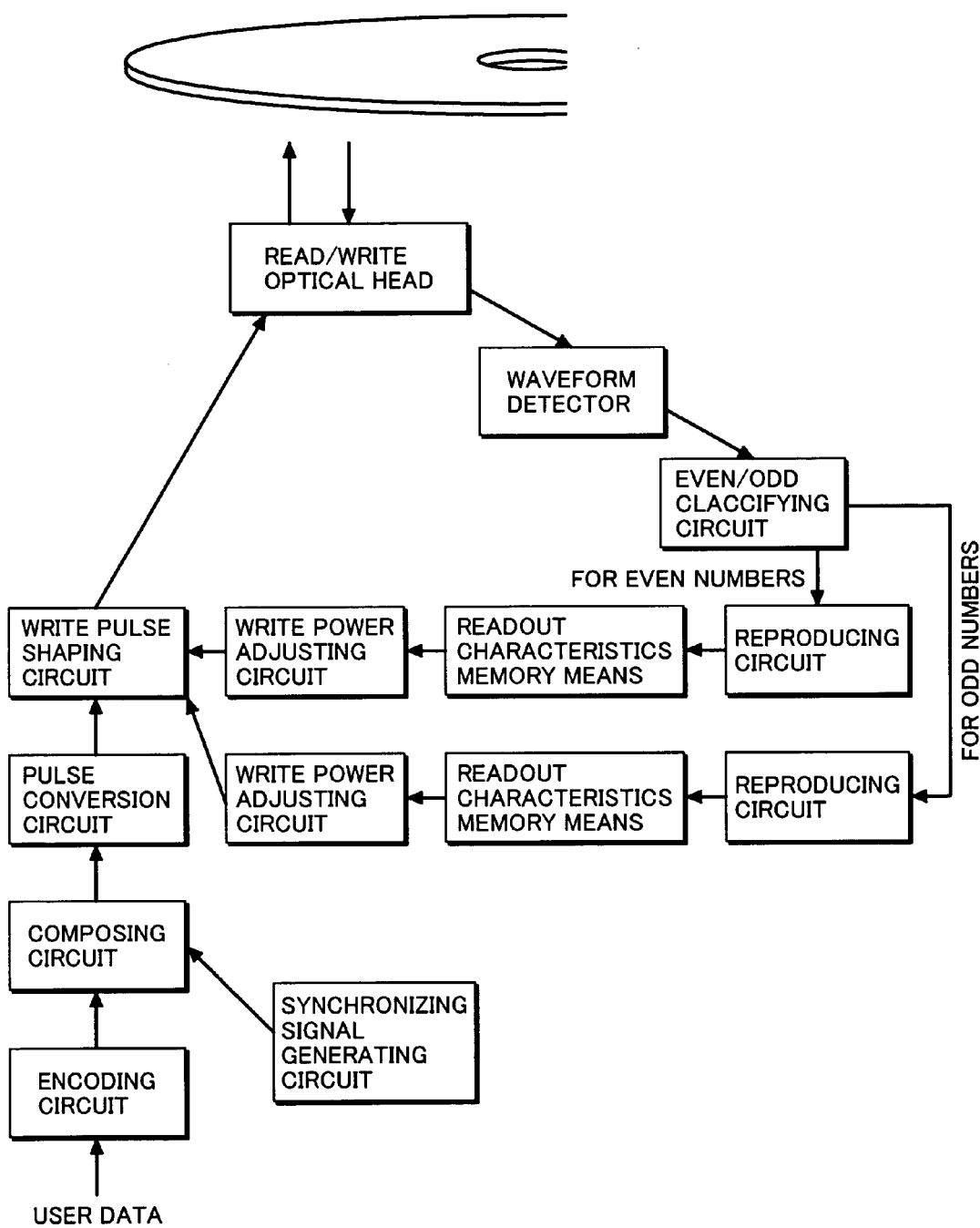
FIG. 18 is an illustration showing an example of device used in the present invention.

For the present embodiment, we will describe a device used for test writing or actual recording conducted in the above embodiment. Here, as an example of device, we will show an example of the device for 2T strategy such as the one shown in the embodiment 1. The overall view of the device is shown in FIGS. 16, 17 and 18. Recording data are converted into a recording code language by an encoding circuit, are composed by a synchronizing circuit with synchronizing signals generated by a synchronizing signal generating circuit and a composing circuit are inputted into a pulse conversion circuit. Then, they are converted into pulse data by a pulse conversion circuit, shaped into pulse shape by a write pulse shaping circuit and drive the light source. Up to this point, FIGS. 16, 17 and 18 are common.

A device provided with an even/odd classified test-write pattern generating circuit having two write power levels for classifying even number length marks and odd number length marks and for generating write pattern is shown in FIG. 16. An even/odd classified test-write pattern generating circuit generates respectively write patterns for test writing composed of even number length marks and write patterns for test writing composed of odd number length marks and record them on a disk. The recorded signals are detected by a waveform detector, their recording ability is evaluated by the reproducing circuit, and the relationship between the recording conditions and the recording ability is stored in the read-out characteristics memory means. Then, a write power adjusting circuit determines the following write power, and returns to the write pulse shaping circuit. Incidentally, the even/odd classified test-write pattern generating circuit described in FIG. 16 may be a test-write pattern generating circuit wherein natural number nx length marks in the window width are classified according to the excess obtained by dividing n by an integer constant of two or more. In this way, the optimum write power for each write pattern is sought, and in actual recording the respective write power is set in each odd number length mark and each even number length mark.

FIG. 17 is an illustration showing the configuration (an example) of a device wherein the set value of the write power level is one in the case of using the 2T strategy. It is an example of configuration of the device in the case where the value of set levels of the write power is smaller than the number of write patterns as in the embodiments 7 and 8. As in FIG. 16, two types of write patterns are respectively generated and are recorded on the disk, the recorded signals are detected, and the reproducing circuit evaluates their recording ability. After the optimum value of two types of write patterns are set, the write powers of the two types of write patterns are evaluated by means of a judging equation recorded in a judging equation memory circuit relating to a judging circuit, and when the judgment value of the write power is equal or below the predetermined value, the optimum write power is adjusted in the write power adjusting circuit by means of a calculating equation stored in the write power calculating equation memory circuit. And when the judgment value of the write power is equal or larger than the predetermined value, a write error judgment is displayed and a NG (impossible to write) is displayed. FIG. 17 shows an example of device having a write power setting level for the 2T strategy (two write patterns). However, a device having a smaller than n number of write power setting levels for n number of write patterns may also be used.

FIG. 18 is an illustration showing the configuration (an example) of a device using random signals without dividing the write patterns for test writing between even number length marks and odd number length marks. The random signals recorded by test writing are detected in a waveform detector, and then are classified into even number length marks and odd number length marks in a even/odd classifying circuit. In FIG. 18, a reproducing circuit, a reproduction characteristic memory means and a write power adjusting circuit respectively dedicated to even number length marks and odd number length marks are provided. These circuits can be easily realized in a circuit, and they can be easily increased to two or a larger number. In addition, in FIG. 18, we described on an even/odd classifying circuit and even a classifying circuit classifying according to the excess obtained by dividing n by an integer constant of two or more for natural number nx length marks in the window width can be equally used. A memory circuit of reproduction characteristics can store modulation, β and other reproduction characteristics.

This invention also includes the following features.

The present invention is a test writing method for setting recording conditions for recording information on an optical information recording medium, wherein write patterns classified according to the excess obtained by dividing the mark length in the recording signals train by an integer constant of two or a larger number corresponding to a natural nx marks in the window width are created, and any write pattern A among the write patterns mentioned above is chosen, and the write powers of other write patterns are chosen in such a way that the latter may have nearly the same value as the modulation mod (A) for the write power Pw (A) of the write pattern A set by the predetermined method.

The above predetermined method of the present invention is a method of recording and reproducing the write pattern A mentioned above by changing the write power, seeking a write power P0 (A) at which the modulation gets 0 due to the relationship between the modulation and the write power, and setting the value obtained by multiplying the above P0 (A) by a constant p as the write power Pw (A) of the write pattern.

The present invention is a test writing method for setting recording conditions for recording information on an optical information recording medium, wherein write patterns classified according to the excess obtained by dividing the mark length in the recording signals train by an integer constant of two or a larger number corresponding to a natural nx marks in the window width are created, and any freely chosen write pattern A among the write patterns mentioned above is chosen, the write power Pw (A) of the write pattern A is set by the predetermined method, the write pattern A is test written by the write power Pw (A) and by changing the write power of other write patterns within a fixed range including Pw (A) and the write powers of other write patterns are set.

The above fixed range of the test writing method of the present invention is a x Pw (A)≦Pw≦b×Pw (A), and 0.8≦a≦1.0, and 1.0≦b≦1.2.

The above predetermined method of the present invention includes recording and reproducing the write pattern A by changing the write power, seeking a write power P0 (A) at which the modulation gets 0 from the relationship between the modulation and the write power, and setting a value obtained by multiplying P0 (A) by a constant p as the write power Pw (A) of the write pattern.

The above test writing method of the present invention includes calculating the modulation by the write power Pw (A) of the write pattern A, calculating the modulation when the write power Pw (A) of the other write patterns is applied, comparing the modulation by the write power Pw (A) and the modulation of other write patterns, and and test writing by changing the range of changing the write power in accordance with the comparison result.

The present invention is a test writing method for setting recording conditions for recording information on an optical information recording medium, wherein write patterns classified according to the excess obtained by dividing the mark length in the recording signals train by an integer constant of two or a larger number corresponding to a natural nx marks in the window width are created, and a write power is sought by test writing by using any write pattern A among the write patterns described above, and the write power of other write patterns by multiplying the write power by a constant q or by adding a constant r.

The present invention is a test writing method for setting recording conditions for recording information on an optical information recording medium, wherein the first write pattern including odd number length minimum marks of a natural number nx length of the window width and the second write pattern including odd number length minimum marks of a natural number nx length of the window width are created, the asymmetry or β or γ of odd number length minimum marks and the asymmetry or β or γ of even number length minimum marks are calculated in such a way these values may be almost equal, and the write power Pw (odd) for recording the first write pattern and the write power Pw (even) for recording the second write pattern are respectively set.

The above test writing method of the present invention includes marks of the same mark length for the first write pattern and the second write pattern and the asymmetry or γ or γ is calculated on the marks of the same mark length.

The present invention is a test writing method for setting recording conditions for recording information on an optical information recording medium, wherein the mark lengths in the recording signal train are classified as a m number (m is a natural number of two or more) of write patterns classified according to the excess obtained by dividing the same by an integer constant of two or a larger number corresponding to a natural number nx length mark in the window width, and recording the same by using a driver having a laser driver whose write power settable level value is smaller than the m number, and includes the steps of seeking the optimum write power for each of the m number of write patterns and of seeking the extent of variation of each write power of the m number of write patterns according to a certain judging equation, the step of setting a common optimum power Pw (opt) according to a calculation equation in the case where the extent of variation is less than the predetermined value, and the step of changing pulse width in the case where the extent of variation is equal or larger than the predetermined value and in the case of a pulse width variable driver, and the step of determining a write error and not allow the information to be recorded in the case of a drive of invariable pulse width.

The present invention is a test writing method for setting recording conditions for recording information on an optical information recording medium, wherein write patterns classified according to the excess obtained by dividing the mark length in the recording signals train by an integer constant of two or a larger number corresponding to a natural number nx marks in the window width are created, and the write pattern is respectively recorded and reproduced by changing the write power, and a write power Pw' at which the modulation gets a% (provided that 0<a) from the relationship between the modulation and the write power is sought, and the value obtained by multiplying the Pw' by the constant p' is set as the write power of each of the write pattern.

The above test writing method of the present invention consists of test writing by using confirming patterns wherein the classified write patterns are mixed at the write power set by each of the write patterns, and by fine adjusting the write power of each of the write patterns.

The above test writing method of the present invention is characterized in that the classified write patterns are write patterns composed of even number length marks and write patterns composed of odd number length marks.

The above test writing method of the present invention is characterized in that the classified write patterns are write patterns formed by nT=3LT marks (L represents pulse number and T represents window width), write patterns formed by nT=(3L−2) T marks, and write patterns formed by nT=(3L−1) T marks.

The above test writing method of the present invention is characterized in that the classified write patterns are write patterns formed by nT=4LT marks (L represents pulse number and T represents window width), write patterns formed by nT=(4L−2) T marks, write patterns formed by nT=(4L−1) T marks and write patterns formed by nT=(4L+1) T.

The information recording device of the present invention includes a test-write pattern recording means for recording the test-write patterns for determining the write power on the recording medium, a waveform detector for detecting the recorded test-write patterns, a reproducing circuit for reproducing the recorded test-write patterns, a judging circuit for judging the reproducing characteristics of the test-write patterns, a circuit for displaying a write error in the case where a NG (impossible to write) judgment is given by the judging circuit, and a write power adjusting circuit for adjusting the write power based on the signal emitted by the waveform detector in the case where GOOD (fit to write) judgment is given by the judging circuit, and the test-write pattern recording means is a means for recording the write patterns classified according to the excess obtained by dividing the mark lengths within the recording signal train by an integer constant of two or a larger number corresponding to a natural nx length marks in the window width, and the write power adjusting circuit is for setting a write power for each of the classified write pattern.

What is claimed is:

1. A test writing method for setting the recording conditions for recording information on an optical information recording medium, the test writing method comprising:

creating write patterns classified according to the excess obtained by dividing the mark lengths within the recording signal train by an integer constant of two or a larger number corresponding to a natural nx length marks in the window width, and recording and reproducing each of said write patterns by changing the write power, seeking respectively a write power P0 at which modulation effectively gets 0 from the relationship between said modulation and write power, and setting the value obtained by multiplying P0 by a constant p as the write power of each of said write patterns, wherein said constant p is within a range of $1.5 \leq p \leq 3.0$.

2. The test writing method according to claim 1 wherein test writings are conducted by using confirming patterns wherein said classified write patterns are mixed with a write power set by each of said write patterns, and the write power of each of said write patterns is fine adjusted.

3. The test writing method according to claim 1 wherein said constant p is within a range of $2.0 \leq p \leq 2.8$.

4. The test writing method according to claim 1 wherein said classified write patterns are write patterns formed by even number length marks and write patterns formed by odd number length marks.

5. The test writing method according to claim 1 wherein said classified write patterns are write patterns formed by the nT=3LT (L represents pulse number and T represents window width) marks, write patterns formed by the nT=(3L−2) T marks, and write patterns formed by the nT=(3L−1) T marks.

6. The test writing method according to claim 1 wherein said classified write patterns are write patterns formed by the nT=4LT (L represents pulse number and T represents window width) marks, write patterns formed by the nT =(4L−2) T marks, write patterns formed by the nT=(4L−1) T marks and write patterns formed by the nT =(4L+1) T marks.

* * * * *